(12) United States Patent
Singh et al.

(10) Patent No.: US 12,086,901 B2
(45) Date of Patent: Sep. 10, 2024

(54) GENERATING DIGITAL PAINTINGS UTILIZING AN INTELLIGENT PAINTING PIPELINE FOR IMPROVED BRUSHSTROKE SEQUENCES

(71) Applicant: Adobe Inc., San Jose, CA (US)

(72) Inventors: Jaskirat Singh, Canberra (AU); Jose Ignacio Echevarria Vallespi, South San Francisco, CA (US); Cameron Smith, Santa Cruz, CA (US)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 17/656,907

(22) Filed: Mar. 29, 2022

(65) Prior Publication Data
US 2023/0316590 A1 Oct. 5, 2023

(51) Int. Cl.
| | |
|---|---|
| *G06T 11/00* | (2006.01) |
| *G06N 3/08* | (2023.01) |
| *G06T 7/194* | (2017.01) |
| *G06T 7/70* | (2017.01) |

(52) U.S. Cl.
CPC ............... *G06T 11/00* (2013.01); *G06N 3/08* (2013.01); *G06T 7/194* (2017.01); *G06T 7/70* (2017.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,984,572 | B1* | 4/2021 | Zacharia | G06T 11/60 |
| 2012/0023456 | A1* | 1/2012 | Sun | G06T 7/194 |
| | | | | 715/863 |
| 2012/0133664 | A1* | 5/2012 | Zhu | G06T 11/001 |
| | | | | 345/582 |
| 2019/0279346 | A1* | 9/2019 | Zhang | G06T 5/50 |

OTHER PUBLICATIONS

Martin Arjovsky, Soumith Chintala, and Léon Bottou. Wasserstein gan. arXiv preprint arXiv:1701.07875, 2017.
(Continued)

*Primary Examiner* — Yi Wang
(74) *Attorney, Agent, or Firm* — Keller Preece PLLC

(57) ABSTRACT

The present disclosure relates to systems, methods, and non-transitory computer readable media for generating painted digital images utilizing an intelligent painting process that includes progressive layering, sequential brushstroke guidance, and/or brushstroke regularization. For example, the disclosed systems utilize an image painting model to perform progressive layering to generate and apply digital brushstrokes in a progressive fashion for different layers associated with a background canvas and foreground objects. In addition, the disclosed systems utilize sequential brushstroke guidance to generate painted foreground objects by sequentially shifting through attention windows for regions of interest in a target digital image. Furthermore, the disclosed systems utilize brushstroke regularization to generate and apply an efficient brushstroke sequence to generate a painted digital image.

20 Claims, 14 Drawing Sheets

(56) References Cited

OTHER PUBLICATIONS

Kevin Crowston. Amazon mechanical turk: A research tool for organizations and information systems scholars. In Shaping the future of ict research. methods and approaches, pp. 210-221. Springer, 2012.
Kevin Frans and Chin-Yi Cheng. Unsupervised image to sequence translation with canvas-drawer networks. arXiv preprint arXiv:1809. 08340, 2018.
Kevin Frans, LB Soros, and Olaf Witkowski. Clipdraw: exploring text-to-drawing synthesis through language-image encoders. arXiv preprint arXiv: 2106.14843, 2021.
Paul A Gagniuc. Markov chains: from theory to implementation and experimentation. John Wiley & Sons, 2017.
Yaroslav Ganin, Tejas Kulkarni, Igor Babuschkin, SM Eslami, and Oriol Vinyals. Synthesizing programs for images using reinforced adversarial learning. arXiv preprint arXiv:1804.01118, 2018.
Alex Graves. Generating sequences with recurrent neural networks. arXiv preprint arXiv:1308.0850, 2013.
David Ha and Douglas Eck. A neural representation of sketch drawings. arXiv preprint arXiv:1704.03477, 2017.
Paul Haeberli. Paint by numbers: Abstract image representations. In Proceedings of the 17th annual conference on Computer graphics and interactive techniques, pp. 207-214, 1990.
Aaron Hertzmann. Painterly rendering with curved brush strokes of multiple sizes. In Proceedings of the 25th annual conference on Computer graphics and interactive techniques, pp. 453-460, 1998.
Aaron Hertzmann. A survey of stroke-based rendering. Institute of Electrical and Electronics Engineers, 2003.
Zhewei Huang, Wen Heng, and Shuchang Zhou. Learning to paint with model-based deep reinforcement learning. In Proceedings of the IEEE International Conference on Computer Vision, pp. 8709-8718, 2019.
Biao Jia, Jonathan Brandt, Radomir Mech, Byungmoon Kim, and Dinesh Manocha. Lpaintb: Learning to paint from self-supervision. arXiv preprint arXiv:1906.06841, 2019.
Glenn Jocher, Alex Stoken, Ayush Chaurasia, Jirka Borovec, NanoCode012, TaoXie, Yonghye Kwon, Kalen Michael, Liu Changyu, Jiacong Fang, Abhiram V, Laughing, tkianai, yxNONG, Piotr Skalski, Adam Hogan, Jebastin Nadar, imyhxy, Lorenzo Mammana, Alex Wang 1900, Cristi Fati, Diego Montes, Jan Hajek, Laurentiu Diaconu, Mai Thanh Minh, Marc, albinxavi, fatih, oleg, and wanghaoyang0106. ultralytics/yolov5: v6.0—YOLOv5n 'Nano' models, Roboflow integration, TensorFlow export, OpenCV DNN support, Oct. 2021.
Justin Johnson, Alexandre Alahi, and Li Fei-Fei. Perceptual losses for real-time style transfer and super-resolution. In European conference on computer vision, pp. 694-711. Springer, 2016.
Dmytro Kotovenko, Matthias Wright, Arthur Heimbrecht, and Björn Ommer. Rethinking style transfer: From pixels to parameterized brushstrokes. arXiv preprint arXiv:2103.17185, 2021.
Jonathan Krause, Michael Stark, Jia Deng, and Li Fei-Fei. 3d object representations for fine-grained categorization. In 4th International IEEE Workshop on 3D Representation and Recognition (3dRR-13), Sydney, Australia, 2013.
Cheng-Han Lee, Ziwei Liu, Lingyun Wu, and Ping Luo. Maskgan: Towards diverse and interactive facial image ma- nipulation. In IEEE Conference on Computer Vision and Pat- tern Recognition (CVPR), 2020.
Peter Litwinowicz. Processing images and video for an impressionist effect. In Proceedings of the 24th annual conference on Computer graphics and interactive techniques, pp. 407-414, 1997.
Beyang Liu, Stephen Gould, and Daphne Koller. Single image depth estimation from predicted semantic labels. In 2010 IEEE Computer Society Conference on Computer Vision and Pattern Recognition, pp. 1253-1260. IEEE, 2010.
Songhua Liu, Tianwei Lin, Dongliang He, Fu Li, Ruifeng Deng, Xin Li, Errui Ding, and Hao Wang. Paint transformer: Feed forward neural painting with stroke prediction. arXiv preprint arXiv:2108. 03798, 2021.
John FJ Mellor, Eunbyung Park, Yaroslav Ganin, Igor Babuschkin, Tejas Kulkarni, Dan Rosenbaum, Andy Ballard, Theophane Weber, Oriol Vinyals, and SM Eslami. Unsupervised doodling and painting with improved spiral. arXiv preprint arXiv:1910.01007, 2019.
Reiichiro Nakano. Neural painters: A learned differentiable constraint for generating brushstroke paintings. arXiv preprint arXiv:1904. 08410, 2019.
Xuebin Qin, Zichen Zhang, Chenyang Huang, Masood Dehghan, Osmar Zaiane, and Martin Jagersand. U2-net: Going deeper with nested u-structure for salient object detection. vol. 106, p. 107404, 2020.
Nancy Reyner. How to paint with layers—in acrylic & oil, Dec. 2017.
Jaskirat Singh and Liang Zheng. Combining semantic guidance and deep reinforcement learning for generating human level paintings. In Proceedings of the IEEE/CVF Conference on Computer Vision and Pattern Recognition, pp. 16387-16396, 2021.
Avishek Siris, Jianbo Jiao, Gary K.L. Tam, Xianghua Xie, and Rynson W.H. Lau. Inferring attention shift ranks of objects for image saliency. In IEEE/CVF Conference on Computer Vision and Pattern Recognition (CVPR), Jun. 2020.
Daniel Teece. 3d painting for non-photorealistic rendering. In ACM SIGGRAPH 98 Conference abstracts and applications, p. 248, 1998.
Greg Turk and David Banks. Image-guided streamline placement. In Proceedings of the 23rd annual conference on Computer graphics and interactive techniques, pp. 453-460, 1996.
C. Wah, S. Branson, P. Welinder, P. Perona, and S. Belongie. The Caltech-UCSD Birds-200-2011 Dataset. Technical Report CNS-TR-2011-001, California Institute of Technology, 2011.
Ning Xie, Hirotaka Hachiya, and Masashi Sugiyama. Artist agent: A reinforcement learning approach to automatic stroke generation in oriental ink painting. IEICE Transactions on Information and Systems, 96(5):1134-1144, 2013.
Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.
Kun Zeng, Mingtian Zhao, Caiming Xiong, and Song Chun Zhu. From image parsing to painterly rendering. ACM Trans. Graph., 29(1):2-1, 2009.
Amy Zhao, Guha Balakrishnan, Kathleen M Lewis, Fredo Durand, John V Guttag, and Adrian V Dalca. Painting many pasts: Synthesizing time lapse videos of paintings. In Proceedings of the IEEE/CVF Conference on Computer Vision and Pattern Recognition, pp. 8435-8445, 2020.
Ningyuan Zheng, Yifan Jiang, and Dingjiang Huang. Strokenet: A neural painting environment. In International Conference on Learning Representations, 2018.
Zhengxia Zou, Tianyang Shi, Shuang Qiu, Yi Yuan, and Zhenwei Shi. Stylized neural painting. In Proceedings of the IEEE/CVF Conference on Computer Vision and Pattern Recognition, pp. 15689-15698, 2021.
N. Xie, H. Hachiya, and M. Sugiyama, "Artist agent: A reinforcement learning approach to automatic stroke generation in oriental ink painting," IEICE Transactions on Information and Systems, vol. 96, No. 5, pp. 1134-1144, 2013.

\* cited by examiner

| Method | Stanford Cars | | CUB-Birds | |
|---|---|---|---|---|
| | $\mathcal{L}_{pixel}$ | $\mathcal{L}_{pcpt}$ | $\mathcal{L}_{pixel}$ | $\mathcal{L}_{pcpt}$ |
| RL | 97.85 | 0.67 | 96.14 | 0.76 |
| Semantic-RL | 79.98 | 0.55 | 68.46 | 0.55 |
| Optim | 76.52 | 0.54 | 67.90 | 0.53 |
| Transformer | 87.78 | 0.57 | 82.43 | 0.56 |
| Intelligent Painting System | 56.92 | 0.44 | 50.94 | 0.45 |

*Fig. 9*

GENERATING DIGITAL PAINTINGS UTILIZING AN INTELLIGENT PAINTING PIPELINE FOR IMPROVED BRUSHSTROKE SEQUENCES

BACKGROUND

In the field of digital image editing, autonomous painting models have been developed which generate digitally painted versions of digital images. These models, such as models that use stroke-based rendering ("SBR") and/or various neural network architectures, have revolutionized digital image painting with the ability to focus on recreating non-photorealistic imagery (e.g., digital paintings) through appropriate positioning and selection of discrete image elements such as digital brushstrokes or stipples. Despite the advances of conventional digital image systems that utilize these models, however, conventional systems continue to suffer from a number of disadvantages in generating painted digital images, such as generating digital paintings using inefficient brushstroke sequences and implementing brushstroke sequences that inaccurately represent an artistic painting process.

As just mentioned, many conventional digital image systems utilize inefficient brushstroke sequences. To elaborate, many existing systems utilize mechanical grid-based painting sequences that require (almost) fixed numbers of digital brushstrokes for generating a painted digital image, regardless of image complexity. Indeed, the painting sequences of these conventional systems often include superfluous, redundant, or otherwise wasteful brushstrokes that do not contribute to the final digital painting and/or that are painted over by subsequent brushstrokes within the sequence. Generating painted digital images utilizing brushstroke sequences that include wasteful brushstrokes consumes excessive resources in interactive painting applications that could otherwise be preserved with a more efficient brushstroke sequence. For example, some existing systems generate digital paintings using sequences of five thousand to ten thousand brushstrokes, which is more computationally expensive than generating a similar quality digital painting in two hundred to three hundred brushstrokes.

In addition to their inefficiency, some conventional digital image systems utilize brushstroke sequences that inaccurately reflect the artistic creation process. In particular, some existing systems lack semantic understanding of image contents and rely on a progressive grid-based strategy wherein a digital painting agent divides an overall digital image into successively finer grids and paints each of the grids in parallel. This conventional process inevitably leads to painting sequences hierarchically arranged from the bottom up, which are mechanical in nature and not easily intelligible by actual human users.

Furthermore, some conventional digital image systems are inflexible. More specifically, certain existing systems utilize neural network architectures that rigidly limit their applicability for generating digital paintings in real-world use cases. For instance, some conventional systems utilize recurrent neural networks to perform brushstroke decomposition which, due to the training processes of such neural network architectures, requires access to dense human brushstroke annotations. As a result, existing systems that use models trained on human brushstroke annotations are not adaptable to generating digital paintings for domains beyond those associated with the annotations used in training. As another example, some prior systems use conditional variational autoencoders which limit flexibility by requiring access to time-lapse painting videos from real human artists as training data.

Thus, there are several disadvantages with regard to conventional digital image systems for automated digital painting.

SUMMARY

This disclosure describes one or more embodiments of systems, methods, and non-transitory computer readable media that solve one or more of the foregoing or other problems in the art with an image painting model that generates painted digital images utilizing an intelligent painting process that includes progressive layering, sequential brushstroke guidance, and/or brushstroke regularization. The disclosed systems learn to generate digital canvases (e.g., painted digital images) exhibiting realistic brushstroke sequences with a semantic-aware sequential painting style that accurately reflects real-life artistic painting processes. In some cases, the digital painting pipeline of the disclosed systems includes: 1) a progressive layering process which allows an image painting model to first paint a realistic background scene representation (e.g., a background canvas) before adding the foreground objects in a progressive fashion, 2) a sequential brushstroke guidance process which guides the image painting model through shifting its attention between different image regions in a semantic-aware manner, and/or 3) a brushstroke regularization process which generates a modified brushstroke sequence, often resulting in a 60-80% reduction in the total number of required brushstrokes to generate a painted digital image, as compared to prior systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 9 illustrates an example table of experimental results comparing performance of the intelligent painting system with performances of some prior systems in accordance with one or more embodiments;

DETAILED DESCRIPTION

Figure 1:
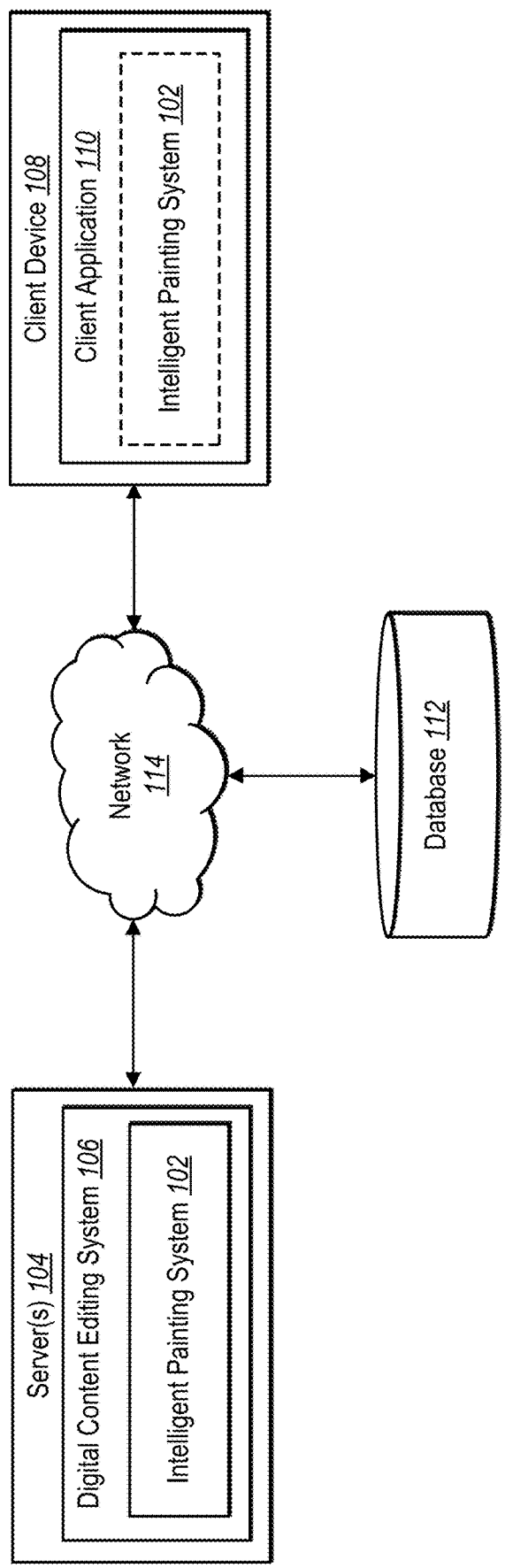
FIG. 1 illustrates an example system environment in which an intelligent painting system operates in accordance with one or more embodiments.

This disclosure describes one or more embodiments of an intelligent painting system that generates painted digital images utilizing progressive layering, sequential brushstroke guidance, and/or brushstroke regularization. Indeed, in some embodiments, the disclosed systems generate a painted digital image by applying digital brushstrokes in progressive layers to generate a background canvas and to add foreground object to the background canvas. In these or other embodiments, the disclosed systems generate a painted digital image (or a painted foreground object within a painted digital image) by guiding digital brushstrokes through attention windows sequentially shifted along a foreground object. Additionally, in one or more embodiments, the disclosed systems generate a modified brushstroke sequence from an initial brushstroke sequence through brushstroke regularization. In some cases, the disclosed systems generate a painted digital image by executing the modified brushstroke sequence using an image painting model.

As just mentioned, in one or more embodiments, the intelligent painting system generates a painted digital image. In particular, the intelligent painting system generates a painted digital image from a target digital image by generating and applying digital brushstrokes to digitally paint a canvas to resemble a painted version of the target digital image. Not only does the intelligent painting system generate a painted digital image to resemble a target digital image, but the intelligent painting system does so using a brushstroke sequence that accurately follows a real-life, artistic painting process. To generate a painted digital image, the intelligent painting system utilizes a digital painting pipeline that includes progressive layering, sequential brushstroke guidance, and/or brushstroke regularization.

As mentioned, in one or more implementations the intelligent painting system generates a painted digital image utilizing a progressive layering process. To elaborate, the intelligent painting system utilizes a progressive layering process to generate a painted background canvas and painted foreground objects in a layered fashion. For instance, the intelligent painting system generates a background canvas utilizing background strokes portraying a background region of a target digital image. In addition (e.g., after generating the background canvas), in some cases, the intelligent painting system generates painted foreground objects utilizing foreground strokes portraying painted versions of foreground objects depicted within the target digital image. In certain embodiments, the intelligent painting system progressively adds the painted foreground objects to the background canvas by applying the foreground strokes to the background canvas.

As also mentioned, the intelligent painting system generates a painted digital image utilizing a sequential brushstroke guidance process. More specifically, the intelligent painting system uses sequential brushstroke guidance to generate a painted version of a foreground object depicted within a target digital image. In some embodiments, the intelligent painting system performs sequential brushstroke guidance by applying digital brushstrokes (e.g., foreground strokes) by sequentially shifting through attention windows placed at different locations or regions within the target digital image (e.g., in relation to a depicted foreground object being painted). In some cases, the intelligent painting system utilizes sequential brushstroke guidance for generating a background canvas in addition to generating painted foreground objects.

As further mentioned, the intelligent painting system generates a modified (more efficient) digital image by utilizing a brushstroke regularization process. In particular, the intelligent painting system generates an initial brushstroke sequence for generating a painted digital image from a target digital image. For instance, the intelligent painting system generates or predicts an initial brushstroke sequence (e.g., using progressive layering and/or sequential brushstroke guidance) and generates a modified brushstroke sequence from the initial brushstroke sequence. In some cases, the intelligent painting system generates the modified brushstroke sequence based on importance vectors and/or brushstroke parameters associated with the various digital brushstrokes within the initial brushstroke sequence. For example, the intelligent painting system determines importance vectors that indicate relative significance of respective brushstrokes for including the brushstrokes within a modified sequence. In one or more embodiments, the intelligent painting system generates a painted digital image by executing a modified brushstroke sequence.

As suggested above, embodiments of the intelligent painting system provide a variety of improvements or advantages over conventional digital image systems. For example, embodiments of the intelligent painting system utilize a novel digital painting pipeline not found in prior systems. To elaborate, the intelligent painting system utilizes a digital painting pipeline that includes one or more of: 1) a progressive layering process, 2) a sequential brushstroke guidance process, and/or 3) a brushstroke regularization process. Indeed, unlike prior systems that rely on grid-based brushstroke sequences, the intelligent painting system utilizes the intelligent painting pipeline described herein to generate painted digital images with fewer brushstrokes and to more accurately represent an artistic painting process.

Due at least in part to implementing the described digital painting pipeline, in some embodiments, the intelligent painting system improves computational efficiency (e.g., in terms of numbers of brushstrokes) over conventional digital image systems. In particular, in some embodiments, the intelligent painting system preserves computing resources by reducing the number of digital brushstrokes for generating a painted digital image, especially compared to prior systems that rely on grid-based painting processes. Indeed, certain embodiments of the intelligent painting system utilize brushstroke regularization to generate a modified brushstroke sequence that reduces the number of digital brushstrokes while maintaining image accuracy and quality for a painted digital image (e.g., by removing or preventing superfluous or wasteful brushstrokes).

Additionally, embodiments of the intelligent painting system can improve accuracy over many conventional digital image systems. In contrast with existing systems that generate painted digital images by applying digital brushstrokes or stipples in unnatural and/or mechanical orders (e.g., conventional grid-based painting systems), the intelligent painting system utilizes a progressive layering process and/or a sequential brushstroke guidance process to apply digital brushstrokes in a sequence that more accurately resembles an artistic painting process. Experimenters have demonstrated that, by utilizing the digital painting pipeline described herein, embodiments of the intelligent painting system not only apply brushstrokes in more accurate sequences but also generate final painted digital images that more accurately resemble an initial target digital image (when using a limited brushstroke budget).

Further, certain embodiments of the intelligent painting system improve flexibility over conventional digital image systems. As opposed to prior systems whose network architectures prevent their application in various domains outside of their specifically annotated training data (or time-lapse videos), some embodiments of the intelligent painting system more flexibly adapt to generating painted digital images in various domains without requiring specifically annotated training data pertaining to the respective domains. Indeed, some embodiments of the intelligent painting system utilize an image painting model that includes a generative adversarial network ("GAN") trained through reinforcement learning for flexible application to generate painted digital images across domains.

As suggested by the foregoing discussion, this disclosure utilizes a variety of terms to describe features and benefits of the intelligent painting system. Additional detail is hereafter provided regarding the meaning of these terms as used in this disclosure. In particular, the term "target digital image" refers to an initial digital image utilized to generated a painted digital image. For instance, a target digital image includes source or target information such as (pixels depicting) non-salient background regions and pixels depicting salient foreground objects that the intelligent painting system seeks to recreate in a digitally painted form. In some cases, a target digital image is a digital photograph or a digital image created by a digital image editor or content creator.

Relatedly, the term "painted digital image" refers to a digital image that is digitally painted using digital brushstrokes. In some cases, a painted digital image includes or portrays non-photorealistic depictions of a particular scene, such as a scene captured in a target digital image (e.g., a digital photograph) using digital brushstrokes to represent painted versions of pixels within the target digital image. For instance, a painted digital image depicts a background canvas portraying a painted version of a background region of a target digital image and further depicts painted foreground objects portraying painted versions of foreground objects of the target digital image.

Along these lines, a "digital brushstroke" (or sometimes simply "brushstroke") refers to a set of one or more pixels that are applied to a digital canvas and that resemble a stroke from a paintbrush (or a stroke from a different applicator such as a pencil, pen, spray can, or an airbrush). For example, digital brushstrokes have different widths, lengths, colors, textures, opacities, or other visual appearances (e.g., as defined by brushstroke parameters). Relatedly, the term "brushstroke sequence" refers to a sequences or series of digital brushstrokes applied to generate a painted digital image. For instance, a brushstroke sequence includes digital brushstrokes applied one after the other at different timesteps of a digital painting process performed by an image painting model. In some cases, a digital brushstroke refers to a background stroke for digitally painting a background canvas of a painted digital image or a foreground stroke for digitally painting a painted foreground object.

As used herein, the term "image painting model" refers to a machine learning model such as a neural network for generating painted digital images. For example, an image painting model generates and applies digital brushstrokes as part of a brushstroke sequence to generate a painted version of a target digital image. In some cases, the image painting model refers to a deep reinforcement learning based actor-critic network, as described by Z. Huang, W. Heng, and S. Zhou in *Learning to Paint with Model-Based Deep Reinforcement Learning*, Proceedings of the IEEE Conf. on Computer Vision, 8709-18 (2019), which is incorporated herein by reference in its entirety. In some embodiments, the image painting model includes multiple components, such as a WGAN neural network as well as an agent policy model for a reinforcement learning agent.

Relatedly, the term "neural network" refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

As used herein, the term "generative adversarial neural network" (sometimes simply "GAN") refers to a neural network that is tuned or trained via an adversarial process to generate an output digital image from an input such as a noise vector. In some cases, a generative adversarial neural network includes multiple constituent neural networks such as an encoder neural network and one or more generator neural networks. For example, an encoder neural network extracts latent code from a noise vector or from a digital image. A generator neural network (or a combination of generator neural networks) generates a modified digital image by combining extracted latent code (e.g., from the encoder neural network). A discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the intelligent painting system to modify parameters of the encoder neural network and/or the one or more generator neural networks to eventually generate digital images that fool the discriminator neural network into indicating that a generated digital image is a real digital image.

As mentioned, the intelligent painting system utilizes a new digital image painting pipeline that includes progressive layering, sequential brushstroke guidance, and brushstroke regularization. As used herein, the term "progressive layering" refers to a process of applying digital brushstrokes to (generate) a painted digital image in a progressive (e.g., layer-by-layer) fashion. For instance, progressive layering involves applying background strokes to generate a background canvas before then applying foreground strokes to add painted foreground objects to the background canvas. In addition, the term "sequential brushstroke guidance" (or sometimes simply "brushstroke guidance") refers to a process of applying digital brushstrokes in a particular sequence as guided or dictated by a set of attention windows shifted among regions of a target digital image. For example, sequential brushstroke guidance involves shifting through a set of coarse-to-fine attention windows located along a foreground object within a target digital image. Further, the term "brushstroke regularization" refers to a process of regularizing brushstroke sequence to compress an initial brushstroke sequence into fewer digital brushstrokes for generating a painted digital image (without appreciably sacrificing image quality).

Additional detail regarding the intelligent painting system will now be provided with reference to the figures. For example, FIG. 1 illustrates a schematic diagram of an example system environment for implementing an intelligent painting system 102 in accordance with one or more embodiments. An overview of the intelligent painting system 102 is described in relation to FIG. 1. Thereafter, a more detailed description of the components and processes of the intelligent painting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 14.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the client device 108, in some embodiments, the environment includes multiple different client devices, each associated with a different user (e.g., a digital image editor). The client device 108 communicates with the server(s) 104 via the network 114. For example, the client device 108 provides information to server(s) 104 indicating client device interactions (e.g., digital image selections, user interactions requesting generation of painted digital images, or other input) and receives information from the server(s) 104 such as generated painted digital images. Thus, in some cases, the intelligent painting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as target digital images and generated painted digital images, individual components (e.g., background canvases and/or foreground objects) of a painted digital image, and/or selectable options for generating painted digital images. In some cases, the client application 110 includes all or part of the intelligent painting system 102.

As illustrated in FIG. 1, the environment includes the server(s) 104. The server(s) 104 generates, tracks, stores, processes, receives, and transmits electronic data, such as indications of client device interactions and/or pixels of digital images. For example, the server(s) 104 receives data from the client device 108 in the form of an indication of a client device interaction to generate a painted digital image. In response, the server(s) 104 transmits data to the client device 108 to cause the client device 108 to display or present a painted digital image based on the client device interaction.

In some embodiments, the server(s) 104 communicates with the client device 108 to transmit and/or receive data via the network 114, including client device interactions, painted digital images, and/or other data. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as an image painting model, stored target digital images, and/or generated painted digital images.

As further shown in FIG. 1, the server(s) 104 also includes the intelligent painting system 102 as part of a digital content editing system 106. For example, in one or more implementations, the digital content editing system 106 can store, generate, modify, edit, enhance, provide, distribute, and/or share digital content, such as digital images. For example, the digital content editing system 106 provides tools for the client device 108, via the client application 110, to generate digital images such as painted digital images depicting digitally painted scenes of landscapes, buildings, animals, people, cars, or other digital content.

In one or more embodiments, the server(s) 104 includes all, or a portion of, the intelligent painting system 102. For example, the intelligent painting system 102 operates on the server(s) to generate painted digital images. In some cases, the intelligent painting system 102 utilizes an image painting model locally on the server(s) 104 or from another network location (e.g., the database 112).

In certain cases, the client device 108 includes all or part of the intelligent painting system 102. For example, the client device 108 can generate, obtain (e.g., download), or utilize one or more aspects of the intelligent painting system 102, such as an image painting model, from the server(s) 104. Indeed, in some implementations, as illustrated in FIG. 1, the intelligent painting system 102 is located in whole or in part on the client device 108. For example, the intelligent painting system 102 includes a web hosting application that allows the client device 108 to interact with the server(s) 104. To illustrate, in one or more implementations, the client device 108 accesses a web page supported and/or hosted by the server(s) 104.

The client device 108 and the server(s) 104 can work together to implement the intelligent painting system 102. For example, in some embodiments, the server(s) 104 train one or more neural networks (e.g., an image painting model) discussed herein and provide the one or more neural networks to the client device 108 for implementation (e.g., to generate painted digital images at the client device 108). In some embodiments, the server(s) 104 train one or more neural networks, the client device 108 requests a painted digital image, the server(s) 104 generate a painted digital image utilizing the one or more neural networks and provide the painted digital image to the client device 108. Furthermore, in some implementations, the client device 108 can assist in training one or more neural networks.

Although FIG. 1 illustrates a particular arrangement of the environment, in some embodiments, the environment has a different arrangement of components and/or may have a different number or set of components altogether. For instance, as mentioned, the intelligent painting system 102 is implemented by (e.g., located entirely or in part on) the client device 108. In addition, in one or more embodiments, the client device 108 communicates directly with the intelligent painting system 102, bypassing the network 114. Further, in some embodiments, an image painting model is stored in the database 112, maintained by the server(s) 104, the client device 108, or a third-party device.

Figure 2:
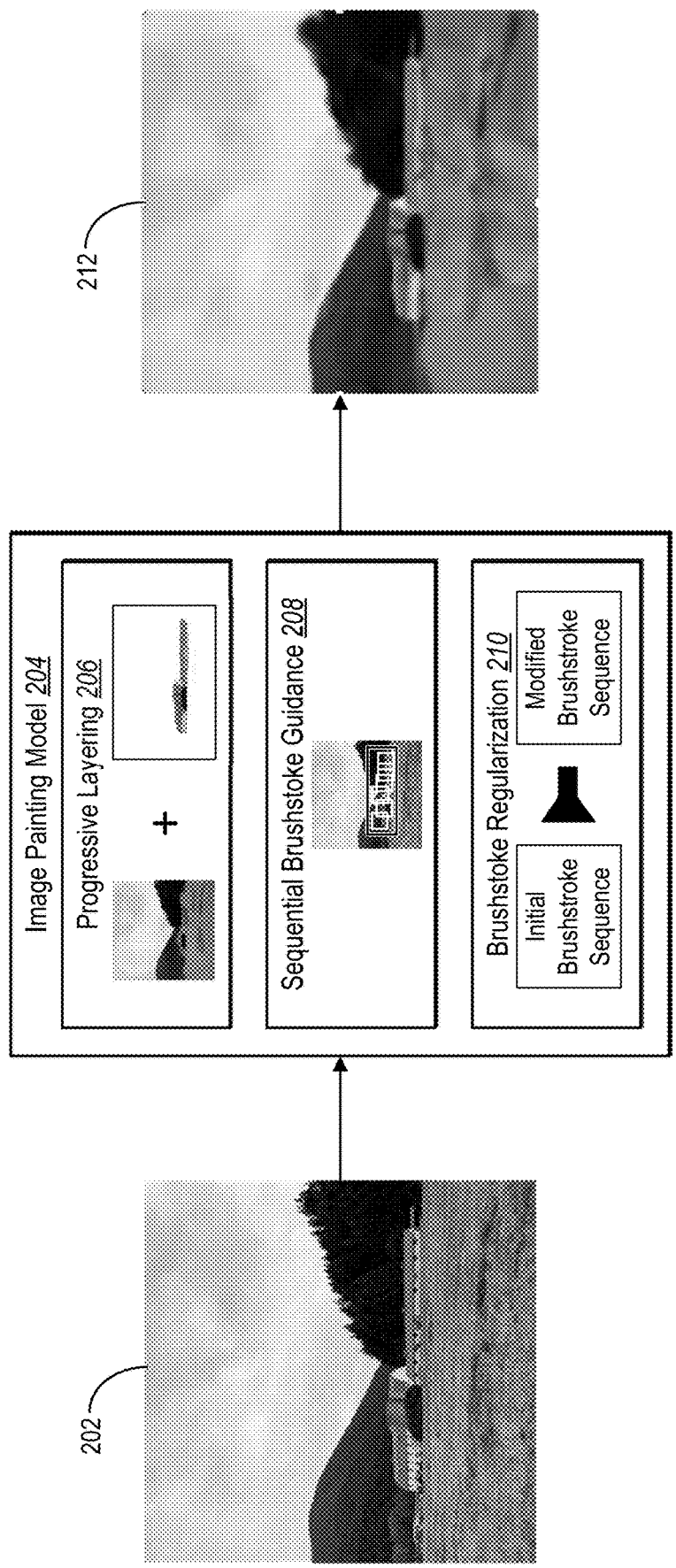
FIG. 2 illustrates an overview of generating a painted digital image utilizing an image painting model to perform a digital painting pipeline in accordance with one or more embodiments.

As mentioned, in one or more embodiments, the intelligent painting system 102 generates a painted digital image utilizing an image painting model. In particular, the intelligent painting system 102 generates a painted digital image to resemble a target digital image in a digitally painted form. FIG. 2 illustrates an overview of generating a painted digital image utilizing an image painting model to perform a digital painting pipeline that includes progressive layering, sequential brushstroke guidance, and brushstroke regularization in accordance with one or more embodiments. While the description of FIG. 2 provides a high-level overview, additional detail regarding the image painting model 204 and the digital painting pipeline implemented by the image painting model 204 is provided thereafter with reference to subsequent figures.

As illustrated in FIG. 2, the intelligent painting system 102 identifies or receives a target digital image 202. For example, the intelligent painting system 102 receives a target digital image 202 as an upload from a client device (e.g., the client device 108) or from a repository of digital images stored within a database (e.g., the database 112) associated with the digital content editing system 106. In some cases, the intelligent painting system 102 receives the target digital image 202 as a digital image generated via client device interactions with the client device 108 running a digital image editing application (e.g., the client application 110). As shown, the target digital image 202 depicts a barn with a red roof in a field with hills and trees in the background.

As further illustrated in FIG. 2, the intelligent painting system 102 utilizes an image painting model 204 to generate a painted digital image 212 from the target digital image 202. In particular, the intelligent painting system 102 performs progressive layering 206, sequential brushstroke guidance 208, and/or brushstroke regularization 210 utilizing the image painting model 204. As shown, the painted digital image 212 depicts a painted version of the barn, the field, and the other portions of the target digital image 202.

As mentioned, the intelligent painting system 102 performs progressive layering 206 as part of generating the painted digital image 212. To elaborate, instead of painting an entire digital image at once or splitting the painting process into a grid-like structure (as some prior systems do), the intelligent painting system 102 first generates a coarse background canvas before adding each of the foreground objects in a progressive fashion. For example, the intelligent painting system 102 generates a realistic background canvas within a first layer (or a first step) of the progressive layering 206 utilizing background strokes. In addition, the intelligent painting system 102 generates a painted foreground object within a second layer (or a second step) of the progressive layering 206 utilizing foreground strokes. As shown, the intelligent painting system 102 generates a painted version of the background region of the target digital image 202 and further adds a painted version of the barn to the background canvas.

In some embodiments, the intelligent painting system 102 performs sequential brushstroke guidance 208 as part of generating the painted digital image 212. More specifically, rather than computing stroke decomposition globally over the entire canvas or over a set of predefined grids (as done by some prior systems), the intelligent painting system 102 shifts the attention of the image painting model 204 through a sequence of coarse-to-fine attention windows. For example, the intelligent painting system 102 focuses on painting the details of certain image regions (e.g., a selected in-focus foreground object) in a particular sequence or order based on shifting through local attention windows at various locations within a global attention window. Specifically, to digitally paint a foreground object, the intelligent painting system 102 selects the (region of the) foreground object with a coarse attention window and generates a set of digital brushstrokes for a fine attention window (or multiple fine attention windows) to digitally paint the foreground object within the coarse attention window.

As further illustrated in FIG. 2, in one or more embodiments, the intelligent painting system 102 performs brushstroke regularization 210 as part of generating the painted digital image 212. In particular, rather than implementing an almost fixed brushstroke budget irrespective of image complexity (as done by some prior systems), the intelligent painting system 102 utilizes an inference-time regularization technique to refine brushstrokes and remove redundancies. For instance, the intelligent painting system 102 generates an initial brushstroke sequence (e.g., utilizing the progressive layering 206 and/or the sequential brushstroke guidance 208) and further generates a modified brushstroke sequence from the initial brushstroke sequence. In certain embodiments, the intelligent painting system 102 determines importance vectors and brushstroke parameters associated with digital brushstrokes of an initial brushstroke sequence and generates the modified brushstroke sequence based on the importance vectors and/or the brushstroke parameters. In some cases, the intelligent painting system 102 further utilizes the image painting model 204 to perform the modified brushstroke sequence to generate the painted digital image 212.

As mentioned above, certain embodiments of the intelligent painting system 102 improve in efficiency, accuracy, and flexibility over prior systems that rely on a grid-based painting process. For comparative purposes, FIG. 3 illustrates an example grid-based painting process employed by a prior system to generate a painted digital image.

Figure 3:
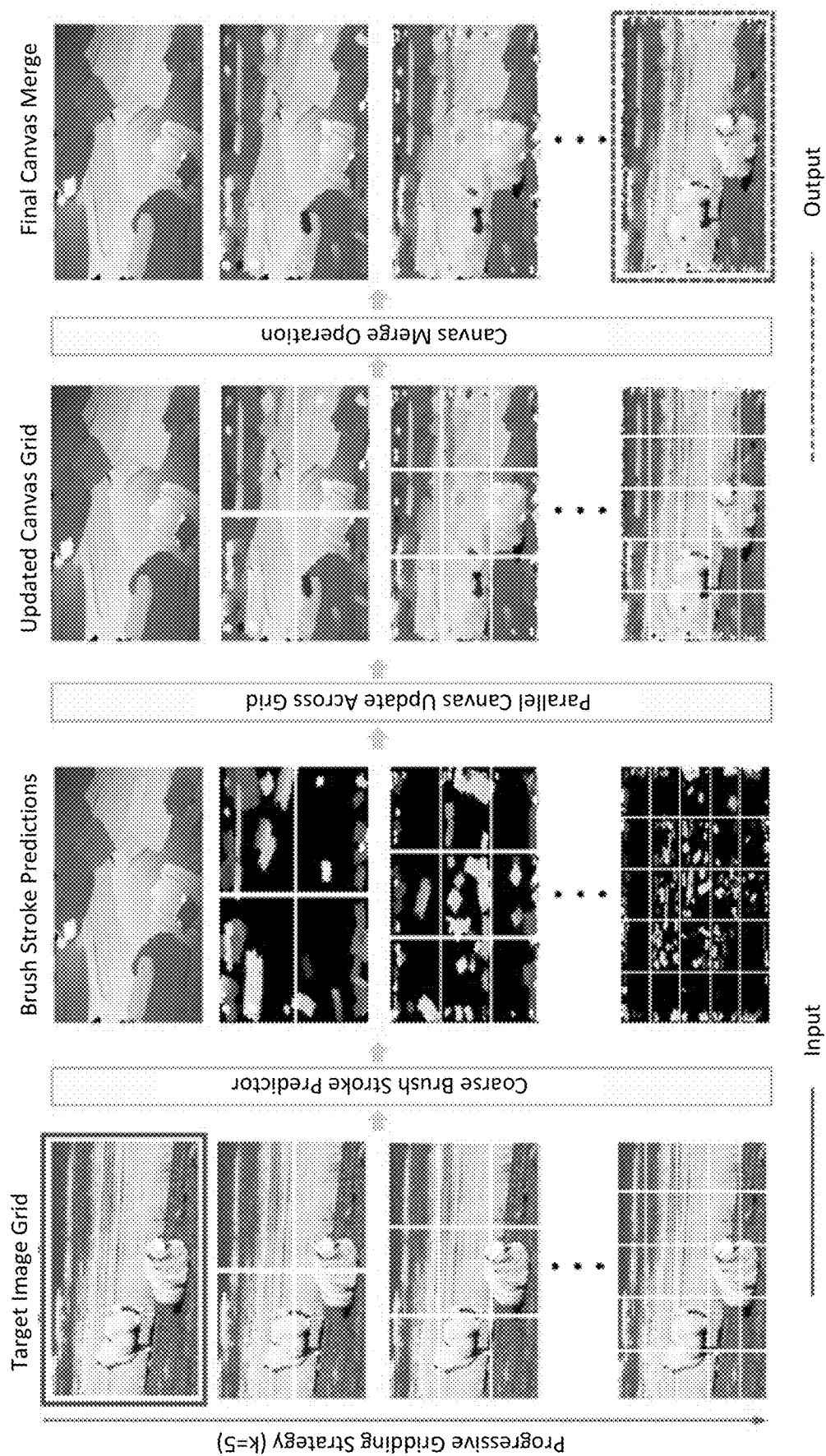
FIG. 3 illustrates an example prior system for generating painted digital images in accordance with one or more embodiments.

As illustrated in FIG. 3, the prior system divides the overall digital image into successively finer grids, shown in the leftmost column. In addition, the prior system proceeds to digitally paint each of the grid sections in parallel. To elaborate, in many cases, the brushstrokes for each grid block are predicted in parallel (e.g., using a coarse brushstroke predictor module), as shown in the second column from the left. After predicting and applying digital brushstrokes, the prior system generates painted grids, as shown in the third column from the left. Further, the prior system merges the k×k independent grid canvases to generate a final painted image, as shown in the rightmost column. As explained in further detail below with reference to subsequent figures, experimental analysis reveals that these types of conventional grid-based techniques not only reduce efficiency of the digital painting process, but also leads to inaccurate painting sequences which do not reflect a real-life painting process (because painters do not paint in discrete grids).

Figure 4:
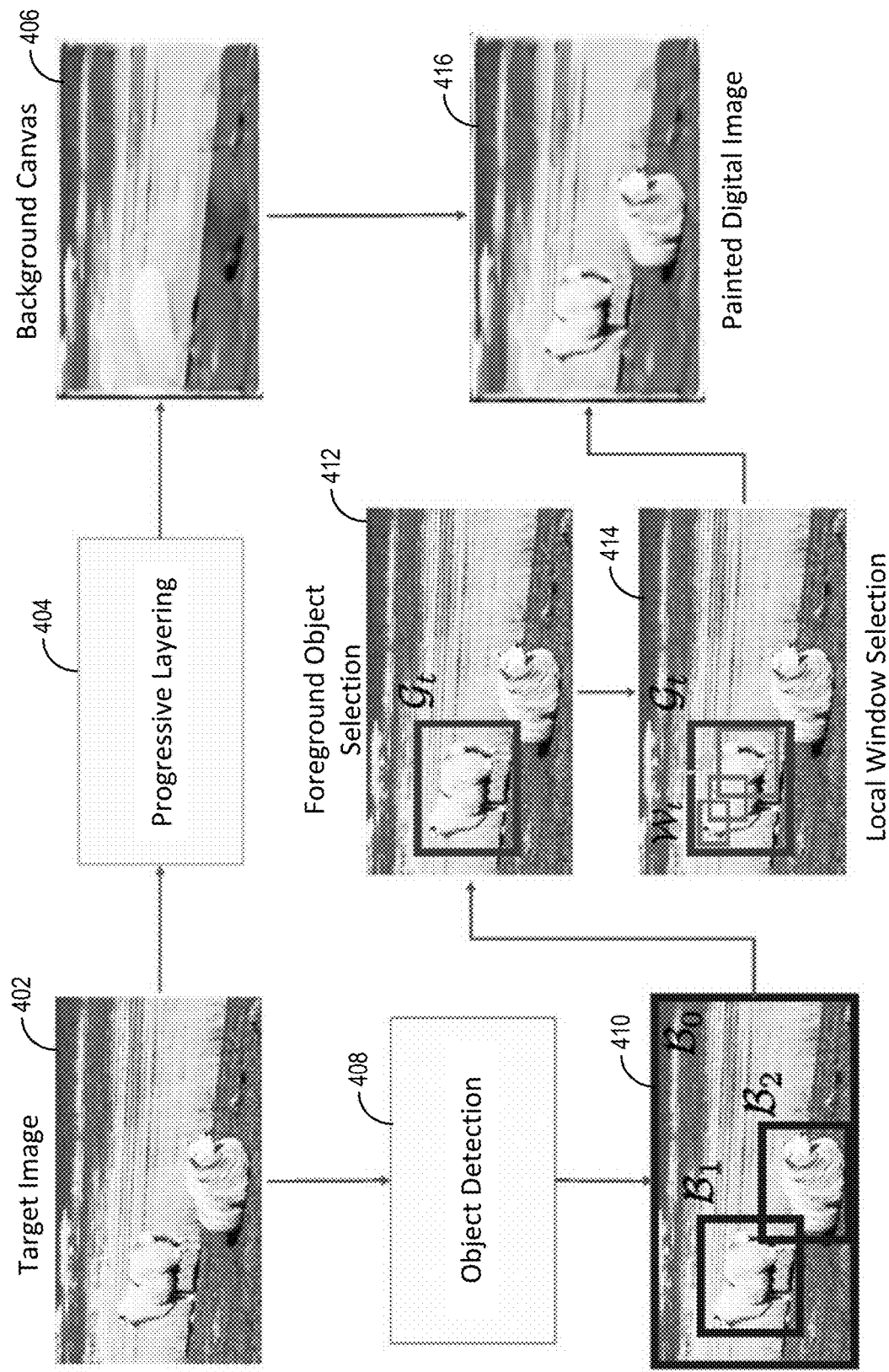
FIG. 4 illustrates an example diagram for performing progressive layering and sequential brushstroke guidance in accordance with one or more embodiments.

As mentioned above, in certain described embodiments, the intelligent painting system 102 improves over prior systems like that illustrated in FIG. 3 by utilizing the digital painting pipeline described herein. In particular, the intelligent painting system 102 utilizes progressive layering and/or sequential brushstroke guidance to generate painted digital images by applying digital brushstrokes in a sequence that more accurately reflects a real-life artistic painting process. FIG. 4 illustrates an example diagram for implementing progressing layering and sequential brushstroke guidance in accordance with one or more embodiments.

In some cases, direct optimization over brushstroke parameters for an entire painting trajectory, results in a high initialization bias. That is, the locations of later brushstrokes are heavily dependent on their initialization in the parameter space. This leads to problems in learning an efficient brushstroke distribution across an entire canvas while also limiting the number of brushstrokes. To address this, in some embodiments, the intelligent painting system 102 utilizes a hybrid optimization strategy where the intelligent painting system 102 first trains a deep reinforcement learning agent (e.g., as part of the image painting model 204) to learn initializations of brushstroke locations. In turn, the intelligent painting system 102 further optimizes the brushstrokes for a target digital image I using localized gradient descent, as described in further detail hereafter.

As illustrated in FIG. 4, the intelligent painting system 102 receives, accesses, or identifies a target digital image 402. From the target digital image 402, the intelligent painting system 102 learns to digitally paint a natural background canvas and, once the background canvas is painted, proceeds to progressively add painted versions of each of the foreground objects which are digitally painted using sequential brushstroke guidance. To this end, the intelligent painting system 102 performs progressive layering 404 to generate the background canvas 406 as a first layer and to add foreground objects as a second layer (e.g., where the second layer for adding the foreground objects is implemented via sequential brushstroke guidance). As shown, the intelligent painting system 102 generates a painted digital image 416 that depicts a painted version of the target digital image 402 portraying sheep in a field.

To achieve the layering process of the progressive layering 404, in some embodiments, the intelligent painting system 102 divides the digital painting process or episode (or the target digital image 402) into multiple layers. For example, the intelligent painting system 102 divides the painting process into layers according to the following equation:

$$C_{out} = \sum_{l=0}^{L-1} \sum_{L=1}^{T/L} C_t^l \odot (1 - S_\alpha(a_t^l)) + S_{color}(a_t^l)$$

where L is the number of layers (e.g., L=2), T is the episode length in timesteps, $C_0^{l=0}$ represents an empty initial canvas, $C_0^{l=1}$ is initialized as the canvas output $C_{T/L}^{l=0}$ from the last layer, $a_t^l$ represent brushstroke parameters for a current painting layer l at timestep t, Gut represents an output state of the digital canvas (e.g., the painted digital image 416), $S_\alpha$ represents a brushstroke alpha map, and $S_{color}$ represents a colored rendering of the brushstroke alpha map.

Utilizing the image painting model, the intelligent painting system 102 further implements the layerwise painting style of the progressive layering 404. For example, the intelligent painting system 102 performs the progressive layering 404 according to (e.g., by optimizing over) a novel background reward function. More particularly, the intelligent painting system 102 utilizes an image painting model (e.g., the image painting model 204) as directed or informed by the background reward function to paint both foreground and background regions while also improving efficiency of background strokes. In some cases, the intelligent painting system 102 utilizes the image painting model 204 (e.g., the conditionally trained WGAN network described by Huang et al.) to perform the progressive layering 206 according to the background reward function.

As part of performing the layerwise painting of the progressive layering 404, in some cases, given a canvas state $C_t$ at timestep t, a target digital image I, and a foreground saliency map $S_f$, the intelligent painting system 102 utilizes a background reward function (or a layer-specific reward function) as given by:

$$r_t^{layer}(l) = D(I \odot \mathcal{M}_f(l), C_{t+1} \odot \mathcal{M}_f(l)) - D(I \odot \mathcal{M}_f(l), C_t \odot \mathcal{M}_f(l))$$

where $D(I, C_t)$ represents the joint conditional Wasserstein GAN score for image I (e.g., the target digital image 402) and digital canvas $C_t$, and where the layered mask $\mathcal{M}_f(l)$ is defined as:

$$\mathcal{M}_f(l) = 1 - S_f \odot (1-l).$$

For instance, when painting the background canvas 406, the intelligent painting system 102 generates the brushstroke r within layer l for timestep t by utilizing the aforementioned background reward function.

In utilizing the background reward function, in some embodiments, the intelligent painting system 102 generates digital canvases (e.g., painted digital images or partially completed painted digital images) to resemble or reflect the appearance of the target digital image 402. Indeed, for reinforcement learning, the intelligent painting system 102 utilizes a reward function rather than (or as a specialized form of) a loss function for training and/or utilizing the image painting model 204. According to the aforementioned background reward function, the intelligent painting system 102 determines a canvas state $C_t$ at timestep t and compares the canvas state $C_t$ with a subsequent canvas state $C_{t+1}$ at timestep t+1. For example, the intelligent painting system 102 generates the background canvas 406 to resemble background regions of the target digital image 402 by comparing the background canvas 406 (at t and t+1) to background regions of the target digital image 402, ignoring salient foreground regions of the target digital image 402 that depict foreground objects.

Based on the comparison, if the intelligent painting system 102 determines that the subsequent canvas state $C_{t+1}$ is closer in appearance to the target digital image 402 (e.g., by a threshold margin) than the canvas state $C_t$, then the intelligent painting system 102 determines that the background reward function is positive. Indeed, in some cases, the intelligent painting system 102 compares the target digital image 402 to the canvas state $C_t$ and/or to the subsequent canvas state $C_{t+1}$ utilizing the background reward function for training and/or implementing the image painting model 204. In some embodiments, the intelligent painting system 102 aims to increase the background reward function (e.g., to make it as positive as possible) over a number of timesteps so that subsequent canvas states more closely resemble the target digital image 402.

In some cases, the intelligent painting system 102 digitally paints over salient regions depicting foreground objects to generate the background canvas 406. In particular, the intelligent painting system 102 generates digital brushstrokes for the salient regions by focusing on the non-salient background regions of the target digital image 402. Thus, the intelligent painting system 102 generates the brushstroke parameters as informed by background pixels to generate colors and shapes that resemble the background region (while also considering a real image distribution manifold to maintain image realism). For instance, the intelligent painting system 102 considers background pixels closest to the foreground object pixels to inform the digital brushstrokes for filling in, or replacing, the foreground object pixels. In effect, the intelligent painting system 102 paints over or removes the foreground objects by replacing the foreground object pixels with digital brushstrokes generating from the background region of the target digital image 402, as with the digital brushstrokes for other regions of the background canvas 406.

In some cases, the intelligent painting system 102 generates more than two layers as part of the progressive layering. For example, the intelligent painting system 102 generates a background canvas as one layer, adds intermediate objects in an intermediate layer, and adds foreground objects in a foreground layer (or different foreground objects in their own respective layers). To achieve progressive layering where L>2, in some cases, the intelligent painting system 102 generates a ranked saliency map for the target digital image 402. Specifically, the intelligent painting system 102 ranks objects depicted within the target digital image 402 according to their respective saliency measures or saliency scores. The intelligent painting system 102 further generates different layers for different saliency scores (or ranges of saliency scores) to generate painted objects in the different layers.

For instance, the intelligent painting system 102 utilizes a ranked saliency map $S_I$ such that $\{S_I[k]\}_{K=1}^L$ indicates salient regions for the target digital image I (e.g., the target digital image 402) in increasing order of saliency. In some cases, the intelligent painting system 102 extends the progressive layering for L>2 using a layered mask $M_I(l)$ for each layer l, in accordance with:

$$M_I(l) = 1 - \bigcup_{k=1}^{L-l} S_I[k].$$

As mentioned above, in some embodiments, the intelligent painting system 102 further implements sequential brushstroke guidance utilizing an image painting model (e.g., the image painting model 204). For example, the intelligent painting system 102 digitally paints the foreground objects utilizing digital brushstrokes in a particular sequence defined or dictated by a sequential brushstroke guidance process. In some cases, the sequential brushstroke guidance process includes two stages: 1) foreground object selection and 2) local attention window selection.

To elaborate, the intelligent painting system 102 performs object detection 408 to detect foreground objects depicted within the target digital image 402. As shown, the intelligent painting system 102 generates object bounding boxes 410 indicating pixels depicting detected foreground objects within the target digital image 402 (e.g., the bounding boxes $B_1$ and $B_2$), along with a bounding box indicating the entire canvas of the target digital image 402 (e.g., the bounding box $B_0$). In some embodiments, the intelligent painting system 102 utilizes a particular object detection model to perform the object detection 408. For example, the intelligent painting system 102 utilizes the model described by Ning Xu et al. in *Deep GrabCut for Object Selection*, published Jul. 14, 2017, which is hereby incorporated by reference in its entirety. Alternatively, the intelligent painting system 102 utilizes one or more of the models described in: U.S. Patent Application Publication No. 2019/0130229, entitled Deep Salient Content Neural Networks for Efficient Digital Object Segmentation, filed Oct. 31, 2017; U.S. patent application Ser. No. 16/035,410, entitled Automatic Trimap Generation and Image Segmentation, filed Jul. 13, 2018; or U.S. Pat. No. 10,192,129, entitled Utilizing Interactive Deep Learning to Select Objects in Digital Visual Media, filed Nov. 18, 2015, each of which are hereby incorporated by reference in their entireties.

For example, to generate the object bounding boxes 410, the intelligent painting system 102 determines or predicts object saliency corresponding to respective objects in the target digital image 402. In some cases, to predict object saliency, the intelligent painting system 102 utilizes the U-2-Net model as described by Xuebin Qin, Zichen Zhang, Chenyang Huang, Masood Dehghan, Osmar Zaiane, and Martin Jagersand in *U2-Net: Going Deeper with Nested U-Structure for Salient Object Detection*, vol. 106, p. 107404 (2020), which is incorporated herein by reference in its entirety. In addition, to generate the bounding boxes based on object saliency, the intelligent painting system 102 determines the union over bounding box outputs from a pretrained Yolo-v5, as described by Glenn Jocher et al. in *Ultralytics/yolov5: v.6.0-YOLOv5n 'Nano' Models*, Roboflow integration, TensorFlow export, OpenCV DNN support (2021), which is incorporated herein by reference in its entirety.

In addition, the intelligent painting system 102 digitally paints each of the detected foreground objects in a progressive fashion (e.g., one at a time). For example, the intelligent painting system 102 selects and paints one in-focus foreground object before proceeding to select and paint another in-focus foreground object. Indeed, the intelligent painting system 102 performs foreground object selection 412 by selecting an in-focus foreground object within the target digital image 402 by predicting coordinates of a coarse global attention window $G_t$ indicating the in-focus foreground object, as shown in FIG. 4. In some cases, the intelligent painting system 102 models the global attention window $G_t$ as a convex combination of each of the in-image bounding box detections $B_i \in \mathbb{R}^4$, $i \in [1,N]$, where the coordinates of the global attention window are given by $G_t = x_t^G$, $y_t^G$, $w_t^G$, $h_t^G$, defining an x coordinate $x_t^G$, a y coordinate $y_t^G$, a width $w_t^G$, and a height $h_t^G$ of the global attention window. Specifically, the intelligent painting system 102 generates a global attention window for the in-focus foreground object according to:

$$G_t = \sum_{i=0}^{N} \alpha_i^t B_i,$$

$$\text{s.t. } \forall t \sum_i \alpha_i^t = 1,$$

$$\alpha_i^t \geq 0$$

where $\alpha^t = \{\alpha_0^t, \ldots, \alpha_N^t\} \in \mathbb{R}^{N+1}$ are the spatial attention parameters predicted by an image painting model (e.g., the image painting model 204) at timestep t, and $B_0$ represents an attention window over the entire canvas that is used while switching focus to background image areas.

To elaborate on the foreground object selection 412, in some embodiments, the intelligent painting system 102 implements a particular foreground object selection algorithm. For instance, the intelligent painting system 102 utilizes the image painting model 204 to perform a foreground object selection algorithm according to the following:

---
Foreground Object Selection
---
Input: Foreground selection convex coefficients $\alpha^t$; In-image bounding box detections $B_i \in \mathbb{R}^4$, $i \in [1,N]$.
Output: Coarse object attention window $G_t$.
Defaults: Bounding box over the entire image $B_0$.
   function OBJECTSELECT($\alpha^t, \{B_0,\ldots,B_N\}$)
      $\{\alpha_0^t,\ldots,\alpha_N^t\} = \alpha^t \in \mathbb{R}^{N+1}$;
      $G_t = \Sigma_{i=0}^N \alpha_i^t B_i$;
      return $G_t$.
   end function.
---

As a further stage of the sequential brushstroke guidance, in some cases, the intelligent painting system 102 performs local attention window selection 414 (e.g., Markovian window adjustment). To elaborate, the intelligent painting system 102 determines and selects local attention windows within each global (e.g., coarse) attention window $G_t$ corresponding to respective in-focus foreground objects. For example, as shown in FIG. 4, the intelligent painting system 102 learns (via the image painting model 204) to sequentially shift its focus through different in-object features by utilizing a sequence of coarse-to-fine local attention windows $W_t$ within the global attention window $G_t$. Thus, to digitally paint a given foreground object, the intelligent painting system 102 determines a global attention window and moves along a series of fine attention windows within the global attention window. Accordingly, to generate painted foreground objects for an entire painted digital image, the intelligent painting system 102 utilizes a sequence of coarse-to-fine attention windows that, for each foreground object, start with a global attention window for the foreground object and shifts along finer attention windows that progressively shrink therein to digitally paint the details of the foreground object.

Particularly, given a set of coarse global attention window (e.g., an object-specific attention window) coordinates $x_t^G$, $y_t^G$, $w_t^G$, $h_t^G$, the intelligent painting system 102 determines finer localized attention window coordinates for a sequence of coarse-to-fine attention windows within the global attention window $G_t$. For instance, the intelligent painting system 102 determines the coordinates for the finer localized attention windows based on Markovian coordinate refinements according to:

$$x_{t+1}^L = x_{t+1}^G + (x_t^L + \Delta x_t) w_{t+1}^G,$$

$$y_{t+1}^L = y_{t+1}^G + (y_t^L + \Delta y_t) h_{t+1}^G,$$

$$w_{t+1}^L = (\max(1-\tilde{t}, w_{min}) + \Delta w_t) w_{t+1}^G,$$

$$h_{t+1}^L = (\max(1-\tilde{t}, h_{min}) + \Delta h_t) h_{t+1}^G$$

where $\tilde{t} \in [0,1]$ is a normalized painting episode timestep, ($w_{min}$, $h_{min}$) are the minimum attention window dimensions (e.g., width and height), and $(\Delta W_t = \Delta x_t, \Delta y_t, \Delta w_t, \Delta h_t) \in \mathbb{R}^4$ are successive Markovian coordinate refinements predicted via the image painting model 204.

Indeed, the intelligent painting system 102 determines or predicts successive coordinate locations for coarse-to-fine local attention windows (within a global attention window) in a Markovian fashion. For instance, the intelligent painting system 102 adjusts coordinates and sizes of the local attention windows to start with bigger sizes placed in areas of the global attention window with less detail and to place progressively smaller fine attention windows along regions of the foreground object (e.g., regions with progressively more detail) until the smallest local attention window is placed at the most detailed part of the foreground object (e.g., the sheep's head which includes eyes, ears, and different shapes and colors).

To elaborate on the Markovian updates for local attention window selection 414, in some embodiments, the intelligent painting system 102 utilizes a particular Markovian update algorithm (or a local attention window algorithm). For example, the intelligent painting system 102 utilizes the image painting model 204 to perform the Markovian update algorithm, as given by:

---
Markovian Update Algorithm
---
Input: Current global and local attention windows ($G_t$, $W_t$); Markovian coordinate refinements $\Delta W_t$.
Output: Updated local attention window $W_{t+1}$.
Defaults: $w_{min} = h_{min} = 0.2$.
   function MARKOVUPDATE($W_t$, $G_t$, $\Delta W_t$)
      $x_t^G, y_t^G, w_t^G, h_t^G = G_t$;
      $x_t^L, y_t^L, w_t^L, h_t^L = W_t$;
      $\Delta x_t, \Delta y_t, \Delta w_t, \Delta h_t = \Delta W_t$;
      $x_{t+1}^L = x_{t+1}^G + (x_t^L + \Delta x_t) w_{t+1}^G$;
      $y_{t+1}^L = y_{t+1}^G + (y_t^L + \Delta y_t) h_{t+1}^G$;
      $w_{t+1}^L = (\max(1-\tilde{t}, w_{min}) + \Delta w_t) w_{t+1}^G$;
      $h_{t+1}^L = (\max(1-\tilde{t}, h_{min}) + \Delta h_t) h_{t+1}^G$;
      $W_{t+1} = x_{t+1}^L, y_{t+1}^L, w_{t+1}^L, h_{t+1}^L$;
      return $W_{t+1}$.
   End function.
---

To generate the painted digital image 416, the intelligent painting system 102 further utilizes brushstroke parameter adjustment to modify the predicted brushstroke parameters $a_t^l$ so as to constrain the image painting model 204 to only draw within the localized attention window. For example, the intelligent painting system 102 utilizes a parameters adjustment procedure expressed as:

$$a_t^l \leftarrow \text{ParamAdjustment}(a_t^l, W_t).$$

To elaborate on the parameter adjustment, in some embodiments, the intelligent painting system 102 utilizes a particular parameter adjustment algorithm, ParamAdjustment. For example, the intelligent painting system 102 determines that $a_t^l$ at each timestep t depicts the parameters of a quadratic Bezier curve as follows:

$$a_t^l = (x_0, y_0, x_1, y_1, x_2, y_2, z_0, z_2, w_0, w_2, r, g, b)$$

where the first 10 parameters ($x_0$, $y_0$, $x_1$, $y_1$, $x_2$, $y_2$, $z_0$, $z_2$, $w_0$, $w_2$) represent brushstroke position/coordinates, shape, and transparency, and the last 3 parameters form the RGB representation of the brushstroke color.

To generate the brushstroke parameters at for a given brushstroke, in some embodiments, the intelligent painting system 102 determines brushstroke coordinates within a current local attention window $W_t$, including a starting brushstroke coordinate location (e.g., where the brushstroke begins) and an ending brushstroke coordinate location (e.g., where the brushstroke ends). In some cases, the intelligent painting system 102 determines brushstroke shape by determining a starting brushstroke width (e.g., a width where the brushstroke starts) and an ending brushstroke width (e.g., a width where the brushstroke ends). For instance, the intelligent painting system 102 determines a brushstroke width based on an average of the width and height of the current local attention window $W_t$ (e.g., for both the start and end locations) and tapers the brushstroke width evenly between the two widths. In these or other embodiments, the intelligent painting system 102 determines brushstroke transparency by determining a starting brushstroke transparency and an ending brushstroke transparency and generating a gradient between them. In certain cases, the intelligent painting system 102 utilizes the image painting model 204 to perform the following parameter adjustment algorithm:

---

Parameter Adjustment Algorithm

---

Input: Initial vectorized brushstroke prediction $a_t^l$; current local attention window coordinates $W_t$.
Output: Modified brushstroke prediction vector $a_t^l$.
    function ParamAdjustment ($a_t^l$, $W^t$)
        $x_0, y_0, x_1, y_1, x_2, y_2, z_0, z_2, w_0, w_2, r, g, b = a_t^l$;
        $x_t^L, y_t^L, w_t^L, h_t^L = W_t$;
        $x_0 = x_t^L + x_0 \cdot w_t^L$;
        $y_0 = y_t^L + y_0 \cdot h_t^L$;
        $x_2 = x_t^L + x_2 \cdot w_t^L$;
        $y_2 = x_t^L + y_2 \cdot h_t^L$;
        $w_0 = w_0 \cdot \text{avg}(w_t^L, h_t^L)$;
        $w_2 = w_2 \cdot \text{avg}(w_t^L, h_t^L)$;
        $a_t^l = x_0, y_0, x_1, y_1, x_2, y_2, z_0, z_2, w_0, w_2, r, g, b$;
        return $a_t^l$.
    end function.

---

Figure 5:
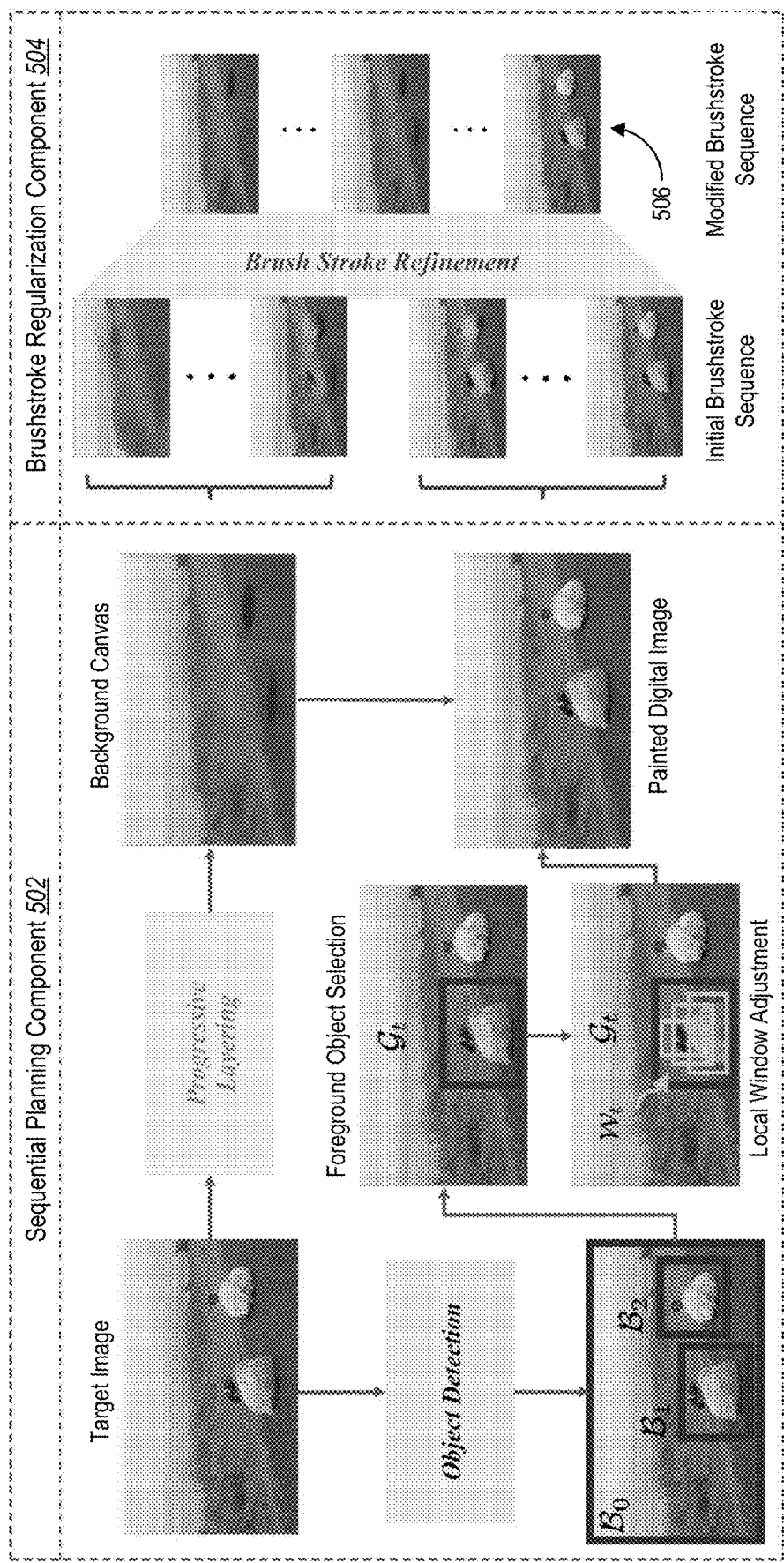
FIG. 5 illustrates an example diagram of a sequential panning component and a brushstroke regularization component of an image painting model in accordance with one or more embodiments.

As mentioned above, in some embodiments, the intelligent painting system 102 utilizes brushstroke regularization to generate a painted digital image. In particular, the intelligent painting system 102 utilizes brushstroke regularization to generate a modified brushstroke sequence from an initial brushstroke sequence determined via progressive layering and/or sequential brushstroke guidance. FIG. 5 illustrates an example diagram of generating a modified brushstroke sequence utilizing brushstroke regularization in accordance with one or more embodiments.

In some embodiments, the intelligent painting system 102 utilizes an image painting model (e.g., the image painting model 204) to implement progressive layering, sequential brushstroke guidance, and/or brushstroke regularization. For instance, the intelligent painting system 102 utilizes a particular component of the image painting model 204 called a sequential planning component 502 to perform a progressive layering process and a sequential brushstroke guidance process, as described above. In addition, the intelligent painting system 102 performs brushstroke regularization utilizing a brushstroke regularization component 504 of the image painting model 204.

To elaborate, the intelligent painting system 102 regularizes an initial brushstroke sequence to generate a modified brushstroke sequence that improves the efficiency of generating a painted digital image by reducing the total number of brushstrokes without (appreciably) altering image quality. As opposed to prior systems that operate on inefficient, fixed brushstroke budgets, the intelligent painting system 102 implements an inference-time brushstroke regularization via the brushstroke regularization component 504 to refine brushstrokes and reduce redundancies. For example, the intelligent painting system 102 generates a modified brushstroke sequence $s_{pred}$ from an initial brushstroke sequence $s_{init}$.

In some embodiments, the intelligent painting system 102 generates a modified brushstroke sequence by first associating each digital brushstroke with a corresponding importance vector to indicate a level or measure of importance for a given brushstroke. For instance, the intelligent painting system 102 generates an importance vector $\beta_t^l$ for a digital brushstroke at timestep t within layer l as given by $\beta_t^l \in [0,1]$. To associate digital brushstrokes with importance vectors, the intelligent painting system 102 modifies the stroke rendering process as:

$$C_{out} = \sum_{l=0}^{L-1}\sum_{L=1}^{T/L} C_t^l \odot \left(1 - \beta_t^l S_\alpha(a_t^l)\right) + \beta_t^l S_{color}(a_t^l)$$

where $\beta_t^l = \text{sign}(x_t^l)$ and $x_t^l \sim N(0, 10^{-3})$ is randomly initialized from a normal distribution. In some implementations, the intelligent painting system 102 determines, learns, or generates an importance vector $\beta_t^l$ based on a total measure of impact or effect that a brushstroke has within a final painted digital image $C_{out}$. Indeed, the intelligent painting system 102 predicts an initial brushstroke sequence (e.g., $\sum_{l=0}^{L-1}\sum_{t=1}^{T/L} C_t^l \odot (1-\beta_t^l S_\alpha(a_t^l)) + \beta_t^l S_{color}(a_t^l)$) and further determines the respective importance vectors $\beta_t^l$ for each of the digital brushstrokes (at each timestep t) within the sequence that result in the painted digital image $C_{out}$, where less impactful brushstrokes have smaller importance vectors and more impactful brushstrokes have larger importance vectors. In some cases, the intelligent painting system determines discrete importance vectors, where unimportant brushstrokes have importance vectors of $\beta_t^l = 0$ and important brushstrokes have importance vectors of $\beta_t^l = 1$.

Using gradient descent, in certain embodiments, the intelligent painting system 102 further determines a brushstroke regularization loss to generate the modified brushstroke sequence. For example, the intelligent painting system 102 optimizes a brushstroke regularization loss function over brushstroke parameters $a_t^l$ and importance vectors $\beta_t^l$ (e.g., by sampling $x_t^l$ and using $\beta_t^l = \text{sign}(x_t^l)$). In some cases, the intelligent painting system 102 utilizes the following brushstroke regularization loss function:

$$L_{total}(a_t^l, x_t^l) = L_2(I, C_{out}) + \gamma \sum_{l=0}^{L-1}\sum_{t=1}^{T/L} \|\beta_t^l\|_1$$

where $L_{total}(a_t^l, x_t^l)$ represents the brushstroke regularization loss, $\partial \beta_t^l / \partial x_t^l = \sigma(x_t^l)(1-(x_t^l))$ represents backpropagation gradients across the importance vectors $\beta_t^l$, $\sigma(\cdot)$ is the sigmoid function, and $\gamma$ balances the weights (or emphasis) between brushstroke refinement and the need to use as few brushstrokes as possible. For example, the intelligent painting system 102 selects (or generates) digital brushstrokes to include within a modified brushstroke sequence (and/or identifies digital brushstrokes to remove or not include)

according to the importance vectors $\beta_t^l$. By utilizing the brushstroke regularization loss, in some cases, the intelligent painting system 102 balances between brushstroke parameters and respective importance vectors associated with digital brushstrokes to determine which brushstrokes to keep, which to remove, and which to modify (or generate) for a modified brushstroke sequence.

For instance, the intelligent painting system 102 keeps digital brushstrokes with higher importance vectors (e.g., above a threshold measure of importance or with an importance vector of 1 in discrete cases) and removes those with lower importance vectors (e.g., below the threshold measure of importance or with an importance vector of 0 in discrete cases). In some case, importance vectors have values of either 0 or 1, and the intelligent painting system 120 removes brushstrokes with importance vectors of 0 and keeps brushstrokes with importance vectors of 1. In these or other embodiments, the intelligent painting system 102 digitally paints each brushstroke to the extent of its importance vector, where those with an importance vector of 1 are painted to their full extent and those with lower importance vectors are applied proportionately (down to 0 where they are not painted).

In addition, the intelligent painting system 102 determines an L2 loss to compare a target digital image I with a painted digital image $C_{out}$ to motivate generating a $C_{out}$ that resembles the I, as indicated by the $L_2$ (I, $C_{out}$) above. Further, the intelligent painting system 102 tries to ensure that generating the painted digital image $C_{out}$ that resembles the target digital image I is done with as few brushstrokes as possible (e.g., by regressing on the L1 norm of the importance vectors $\beta_t^l$), as indicated by the $\gamma \Sigma_{l=0}^{L-1} \Sigma_{t=1}^{T/L} \|\beta_t^l\|_1$ portion of the brushstroke regularization loss above. In some cases, instead of optimizing directly on $\beta_t^l$, the intelligent painting system 102 samples or regularizes over $x_t^l$ and then determines $\beta_t^l$ as $\text{sign}(x_t^l)$.

To elaborate on the brushstroke regularization, in some embodiments, the intelligent painting system 102 performs a specific brushstroke regularization algorithm. For example, the intelligent painting system 102 utilizes the image painting model 204 to generate a modified brushstroke sequence $s_{pred}$ from an initial brushstroke sequence $s_{init}$ utilizing a brushstroke regularization algorithm that incorporates the aforementioned importance vectors and brushstroke regularization loss. In some cases, the intelligent painting system 102 utilizes the following brushstroke regularization algorithm:

---

Brushstroke Regularization Algorithm

Input: A target digital image I; Initial brushstroke sequence
$s_{init} = \{a_t^l | 0 \leq l \leq L - 1, 0 \leq t \leq T/L\}$.
Output: Modified brushstroke sequence $s_{pred}$.
Defaults: Number of layers L; painting episode length T; number of iterations M,
$C_{init} = C_0^{l=0} = $ BLANKCANVAS.
    function STROKEREG($s_{init}$, I)
        $\{a_t^l | 0 \leq l \leq L - 1, 0 \leq t \leq T/L\} = s_{init}$;
        $x_t^l \sim N(0, 10^{-3})$ $\forall l, \forall t$;
        for $0 \leq i \leq M$ do
            $\beta_t^l = \text{sign}(x_t^l)$ $\forall t, l$;
            $C_{out} = \Sigma_{l=0}^{L-1} \Sigma_{t=1}^{T/L} C_t^l \odot (1 - \beta_t^l S_\alpha(a_t^l)) + \beta_t^l S_{color}(a_t^l)$;
            $L_{total}(a_t^l, x_t^l) = L_2(I, C_{out}) + \gamma \Sigma_{l=0}^{L-1} \Sigma_{t=1}^{T/L} \|\beta_t^l\|_1$;

$$a_t^l \leftarrow a_t^l - \frac{\partial L_{total}}{\partial a_t^l} \quad \forall t, l;$$

---

Brushstroke Regularization Algorithm $$x_t^l \leftarrow x_t^l - \frac{\partial L_{total}}{\partial x_t^l} \quad \forall t, l;$$

end for
        $s_{pred} = \{\beta_t^l \cdot a_t^l | 0 \leq l \leq L - 1, 0 \leq t \leq T/L\}$;
        return $s_{pred}$.
    end function.

---

As mentioned above, in one or more implementations, the intelligent painting system 102 generates a painted digital image by utilizing an image painting model (e.g., the image painting model 204) to perform progressive layering, sequential brushstroke guidance, and brushstroke regularization. In particular, the intelligent painting system 102 generates a painted digital image (e.g., the final painted digital image 506) utilizing a specific overall painting algorithm. For example, the intelligent painting system 102 utilizes the overall painting algorithm given by:

---

Overall Painting Algorithm

Input: A target digital image I; image saliency map $S_f$; number of layers L;
painting episode length T.
Required: Reinforcement learning based sequential planner POLICY;
    $W_0 = x_0^L, y_0^L, w_0^L, h_0^L = (0,0,1,1)$;
    $C_{init} = C_0^{l=0} = $ BLANKCANVAS;
    for $0 \leq l \leq L - 1$ do
        for $0 \leq t \leq T/L$ do
            $s_t = (I, C_t^l, G_t, W_t, S_f, l)$;
            $a_t^l, \alpha^t, \Delta W_t = $ POLICY $(s_t)$;
            $G_t = $ OBJECTSELECT($\alpha^t, \{B_0, ..., B_N\}$);
            $W_t = $ MARKOVUPDATE($W_t, G_t, \Delta W_t$);
            $a_t^l \leftarrow $ ParamAdjustment($a_t^l, W_t$);
            $C_{t+1}^l = C_t^l \odot (1 - \beta_t^l S_\alpha(a_t^l)) + \beta_t^l S_{color}(a_t^l)$;
        end for
    end for
    $s_{init} = \{a_t^l | 0 \leq l \leq L - 1, 0 \leq t \leq T/L\}$;
    $s_{pred} = $ STROKEREG($s_{init}$, I);
    return $s_{pred}$.

---

By utilizing one or more of the aforementioned algorithms, the intelligent painting system 102 digitally paints a digital image in multiple successive layers for a realistic evolution of the painting process. Instead of trying to minimize pixel-wise distance between a painted canvas and a target digital image (as is done in prior systems), the intelligent painting system 102 implements a digital painting pipeline for a realistic generation of painted digital images. For instance, the intelligent painting system generates a realistic background scene by focusing on background contents and further adds foreground objects to the background scene. In some cases (e.g., for digital paintings of faces), rather than directly painting based on low-level features, the intelligent painting system 102 first digitally paints a rough outline of a shape and refines the outline to indicate locations for additional detail through appropriate shading. Finally, the intelligent painting system 102 adds the fine-grain details for more exact low-level features according to their respective location indications.

In one or more embodiments, the intelligent painting system 102 trains the image painting model 204 to perform the above algorithm(s). For example, the intelligent painting system 102 utilizes the PixelShuffleNet architecture described by Huang et al. for the image painting model 204 while designing the neural differentiable renderer. In addition, the intelligent painting system 102 trains the image painting model 204 using a layered training technique to conditionally train at each layer while initializing the canvas with the output from the previous layer. To save computation during training, the intelligent painting system 102 traces the successive layer policies in consecutive batches while using the canvas output from the last layer. Further, the intelligent painting system 102 only uses L=2 layers at training time, while some embodiments use L>2 at inference time based on modifying target digital image saliency maps.

In one or more embodiments, the intelligent painting system 102 focuses on spatially close image areas to avoid unnecessary spatial oscillations and to more accurately mimic a real-world artistic painting process. For instance, to prevent unnecessary movements due to oscillations between different global attention windows $G_t$, the intelligent painting system 102 utilizes a particular spatial penalty reward given by:

$$r_t^{spatial} = -\|G_{t+1} - G_t\|_F$$

where $\|\cdot\|_F$ represents the Frobenius norm. To elaborate, the intelligent painting system 102 prevents hopping back and forth between different global attention windows (e.g., for painting different foreground objects) during the digital painting process, instead focusing on a current foreground object within a current global attention window $G_t$ before moving to a subsequent global attention window $G_{t+1}$ to paint a different foreground object.

In a similar fashion, the intelligent painting system 102 focuses color patterns of digital brushstrokes at consecutive/nearby timesteps to more accurately mimic real-world painting. For instance, the intelligent painting system 102 utilizes a particular color transition penalty given by:

$$r_t^{color} = -\|(R,G,B)_{t+1} - (R,G,B)_t\|_F$$

where (R, G, B) represents the brushstroke colors prediction vector at timestep t. Thus, the intelligent painting system 102 generates more realistic sequential brushstrokes that accurately reflect an artistic painting process by preventing drastic or jarring color changes between consecutive brushstrokes at consecutive timesteps through utilizing the color transition penalty $r_t^{color}$. Indeed, the intelligent painting system 102 reduces or minimizes the difference between brushstroke colors at the current timestep $((R,G,B)_t)$ and brushstroke colors at a subsequent timestep $((R,G,B)_{t+1})$.

In some embodiments, the intelligent painting system 102 performs an overall training for the overall sequential planning component 502. For instance, the intelligent painting system 102 performs an overall training the intelligent painting system 102 utilizing the color transition penalty $r_t^{color}$, the spatial penalty reward $r_t^{spatial}$ and/or other training rewards/penalties. In some cases, the intelligent painting system 102 uses a model-based deep deterministic policy gradient algorithm (as described by Huang et al.) with an overall reward function for each layer l given by:

$$r_t^{overall}(l) = r_t^{layer}(l) + \mu r_t^{gbp} + \eta r_t^{spatial} + \gamma r_t^{color}$$

where $r_t^{gbp}$ represents a guided backpropagation-based focus reward, such as that described by Jaskirat Singh and Liang Zheng in *Combining Semantic Guidance and Deep Reinforcement Learning for Generating Human Level Paintings*, Proceedings of the IEEE Conf. on Computer Vision and Pattern Recognition, 16387-96 (2021), which is incorporated herein by reference in its entirety. In some cases, the intelligent painting system 102 sets the hyperparameter μ to 10 while consistency penalty coefficients η and γ are raised from $10^{-4}$ to 0.1 in a linear schedule during training. In some embodiments, the intelligent painting system 102 trains the image painting model 204 for a total of 5 million iterations with a batch size of 128.

Figure 6:
FIG. 6 illustrates an example of performing object removal and digital background painting in accordance with one or more embodiments.

In one or more embodiments, the intelligent painting system 102 utilizes an image painting model (e.g., the image painting model 204) for object removal. In particular, the intelligent painting system 102 implements one or more of the progressive layering, the sequential brushstroke guidance, and/or the brushstroke regularization to remove foreground objects from digital images. FIG. 6 illustrates performing object removal utilizing the image painting model described herein in accordance with one or more embodiments.

As illustrated in FIG. 6, the intelligent painting system 102 removes one or more objects from a digital image. For example, the intelligent painting system 102 uses progressive layering (and/or sequential brushstroke guidance and/or brushstroke regularization) to remove foreground objects by replacing foreground pixels depicting the foreground objects with replacement pixels identified or selected from one or more background regions. In some cases, the intelligent painting system 102 determines salient regions (e.g., depicting foreground objects) and non-salient regions (e.g., depicting background regions) of a target digital image as described above.

In addition, the intelligent painting system 102 replaces pixels from salient regions with pixels from non-salient regions, similar to the aforementioned process for generating a background canvas. For instance, the intelligent painting system 102 essentially generates a background canvas to resemble a background region of a target digital image by replacing pixels of foreground objects with pixels from background regions. In some embodiments, the intelligent painting system 102 utilizes or generates a saliency map to determine or detect foreground objects and background regions of a digital image. The intelligent painting system 102 further generates replacement pixels for the foreground object pixels (as indicated by salient regions) from background pixels (as indicated by non-salient regions) surrounding the foreground objects to be removed. In some cases, the intelligent painting system 102 effectively removes a foreground object by replacing its pixels with pixels generated or predicted from nearby background pixels.

In one or more embodiments the intelligent painting system 102 removes the foreground objects while also digitally painting the background regions. For example, the intelligent painting system 102 generates a background canvas using a brushstroke sequence that digitally paints background portions without adding back the foreground objects. Thus, the intelligent painting system 102 generates realistic (e.g., resembling artist paintings) background paintings by removing foreground objects and applying background strokes that replace (or inpaint) pixels removed with foreground objects.

As compared to prior object removal systems, the intelligent painting system 102 generates more realistic digital images upon performing object removal. For example, the intelligent painting system 102 generates painted backgrounds that look more consistent, where painted regions where objects are removed are more consistent with the rest of the background. Indeed, as shown in FIG. 6, the painted digital images generated by the intelligent painting system 102 more accurately portray background pixels replacing a removed foreground object compared to the conventional image inpainting system provided. For instance, the columns 602 and 608 include target digital images or original digital images. The columns 604 and 610 include painted digital images generated by the intelligent painting system 102 after removing one or more foreground objects. By contrast, the columns 606 and 612 include digital images generated by a prior system described by Jiahui Yu et al. in *Generative Image Inpainting with Contextual Attention*, Proceedings of the IEEE Conf. on Computer Vision and Pattern Recognition, 5505-14 (2018). As shown, the painted digital images in the columns 604 and 610 show more accurately and/or more completely removed foreground objects than the digital images in the columns 606 and 612.

Figure 7:
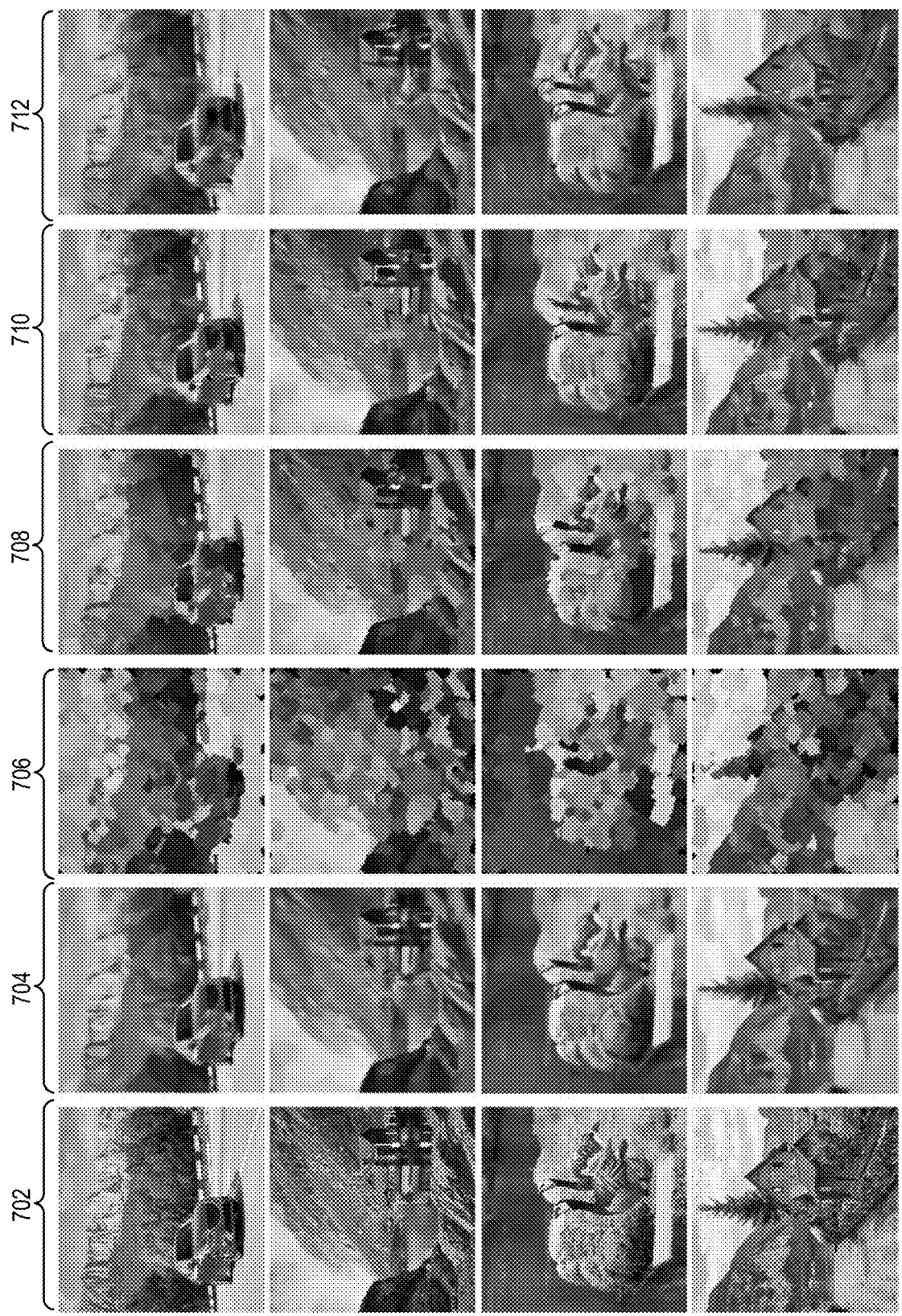
FIG. 7 illustrates an example comparison of painted digital images generated by the intelligent painting system and some prior systems in accordance with one or more embodiments.

As mentioned above, the intelligent painting system 102 generates more accurate painted digital image compared to prior systems. For example, by utilizing described image painting model to implement progressive layering, sequential brushstroke guidance, and/or brushstroke regularization, the intelligent painting system 102 generates painted digital images that resemble painted forms of target digital images compared to prior systems. FIG. 7 illustrates a comparison of painted digital images generated by one or more embodiments of the intelligent painting system 102 and painted digital images generated by various prior systems.

As illustrated in FIG. 7, the intelligent painting system 102 generates the painted digital images within the column 704 from the target digital images within the column 702. By contrast, various prior systems generate the painted digital images in the remaining columns. For example, the painted digital images in the column 706 are generated by the system described by Shonghua Lui et al. in *Paint Transformer: Feed Forward Neural Painting with Stroke Prediction*, arXiv: 2108.03798 (2021). In addition, the painted digital images in the column 708 are generated by the system described by Zhengxia Zou et al. in *Stylized Natural Painting*, Proceedings of the IEEE Conf. on Computer Vision and Pattern Recognition, 15689-98 (2021). Further, the painted digital images in the column 710 are generated by the system described by Zhewei Huang et al. in *Learning to Paint*, as cited above. Lastly, the painted digital images in the column 712 are generated by the system described by Jaskirat Singh et al. in *Combining Semantic Guidance and Deep Reinforcement Learning for Generating Human Level Paintings*, Proceedings of the IEEE Conf. on Computer Vision and Pattern Recognition, 16387-96 (2021). From among the models shown, the intelligent painting system 102 generates painted digital images that most accurately reflect the respective target digital images while still portraying a painted quality using digital brushstrokes.

Figure 8:
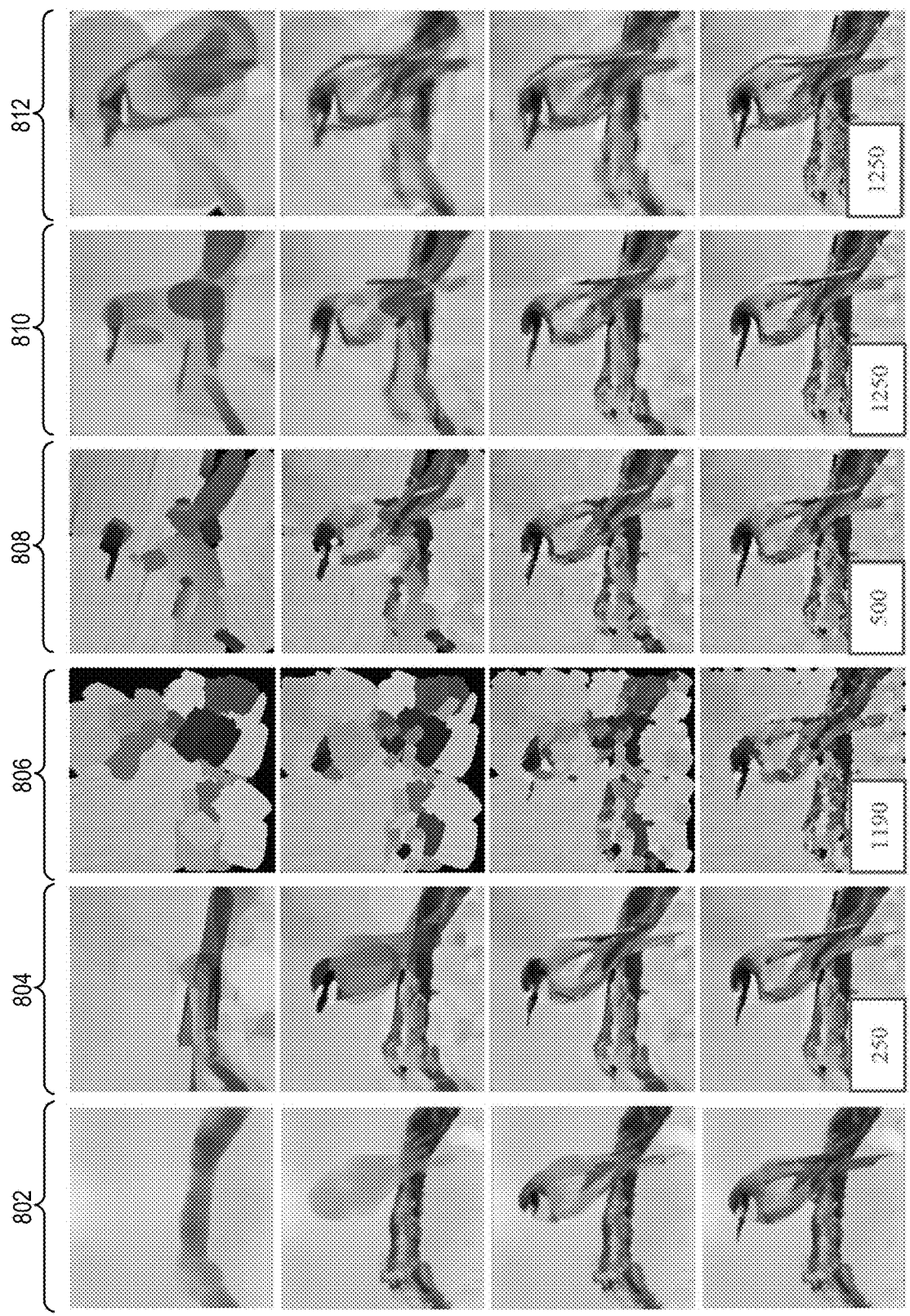
FIG. 8 illustrates an example comparison of brushstroke sequences implemented by the intelligent painting system and some prior systems in accordance with one or more embodiments.

As mentioned, in certain embodiments, the intelligent painting system 102 not only generates painted digital images that more accurately resemble target digital images but the intelligent painting system 102 also does so using a more accurate (e.g., human-relatable) digital painting process. In particular, the intelligent painting system 102 applies digital brushstrokes in a brushstroke sequence that more accurately reflects a realistic painting process (e.g., by painting a background first followed by general object outlines and finally object details). Not only does the intelligent painting system 102 utilize a more accurate digital painting process, but certain embodiments of the intelligent painting system 102 also improve efficiency by reducing the number of digital brushstrokes for generating a painted digital image. FIG. 8 illustrates an example comparison of the digital painting process of the intelligent painting system 102 with digital painting processes of prior systems in accordance with one or more embodiments.

As illustrated in FIG. 8, each of the rows of digital images correspond to particular completion percentages of generating a final painted digital image—10%, 40%, 60%, and 100%, respectively, from the top row down to the bottom. The reference digital images in the first column 802 are painted by an artist. As shown, the first digital image in the first column 802 depicts a background without any indication of a bird. Continuing down the first column 802, the second digital image depicts a general outline of a bird, while the third digital image includes addition bird detail, and the last digital image completes the finest bird detail. This progression down the first column 802 indicates the realistic painting process of an artist.

As further illustrated, the digital images in the column 804 are generated by one or more embodiments of the intelligent painting system 102 using the described image painting model to perform one or more of progressive layering, sequential brushstroke guidance, and/or brushstroke regularization. As shown, the first digital image in the second column 804 depicts a painted background canvas. In addition, the second digital image depicts an outline of the bird, while the second digital image depicts additional bird details, and the fourth digital image depicts final bird details, much like the corresponding digital images in the first column 802.

Additionally, the digital images in the third column 806 are generated by the system described by Shonghua Lui et al., as cited above. Further, the digital images in the fourth column 808 are generated by the system described by Zhengxia Zou et al., as cited above. In addition, the digital image in the fifth column 810 are generated by the system described by Zhewei Huang et al., as cited above. Lastly, the digital images in the sixth column 812 are generated by the system described by Jaskirat Singh et al., as described above.

From among the systems illustrated in FIG. 8, the intelligent painting system 102 uses the most accurate (e.g., human-relatable) digital painting process. For instance, looking across the first row, the digital images generated by each of the prior systems depict pixels for the bird which is not added until later steps in the first column 802. Some of the prior systems even add details such as a beak and a full bird outline (in addition to bird colors) in the first step, while the intelligent painting system 102 uses a more realistic process that resembles the process of the first column 802.

In addition, the intelligent painting system 102 generates a final painted digital image using only 250 brushstrokes, as compared to the prior systems which use far more brushstrokes. Indeed, the next closest prior system uses twice the number of brushstrokes at 500, while others use 4× the number of brushstrokes or more.

As mentioned above, experimenters have demonstrated improvements of the intelligent painting system 102 over prior systems. In particular, experimenters performed an experiment to generate painted digital images using ~300 digital brushstrokes of the intelligent painting system 102, and the same for prior systems such as the system described by Zhewei Huang et al. ("RL"), the system described by Jaskirat Singh et al. ("Semantic-RL"), the system described by Zhengxia Zou et al. ("Optim"), and the system described by Shonghua Lui et al. ("Transformer"). FIG. 9 illustrates a table of experimental results in accordance with one or more embodiments.

As illustrated in FIG. 9, the table 902 indicates final results from the experiment, including an L2 distance $L_{pixel}$ and a perceptual similarity loss $L_{pcpt}$ over two different datasets, the Stanford Cars dataset, and the CUB-Birds dataset. As shown, the intelligent painting system 102 significantly reduces the L2 distance from a target digital image to a painted digital image compared to the prior systems. In addition, the intelligent painting system 102 further exhibits improved perceptual quality, as indicated by the perceptual similarity loss.

Figure 10:
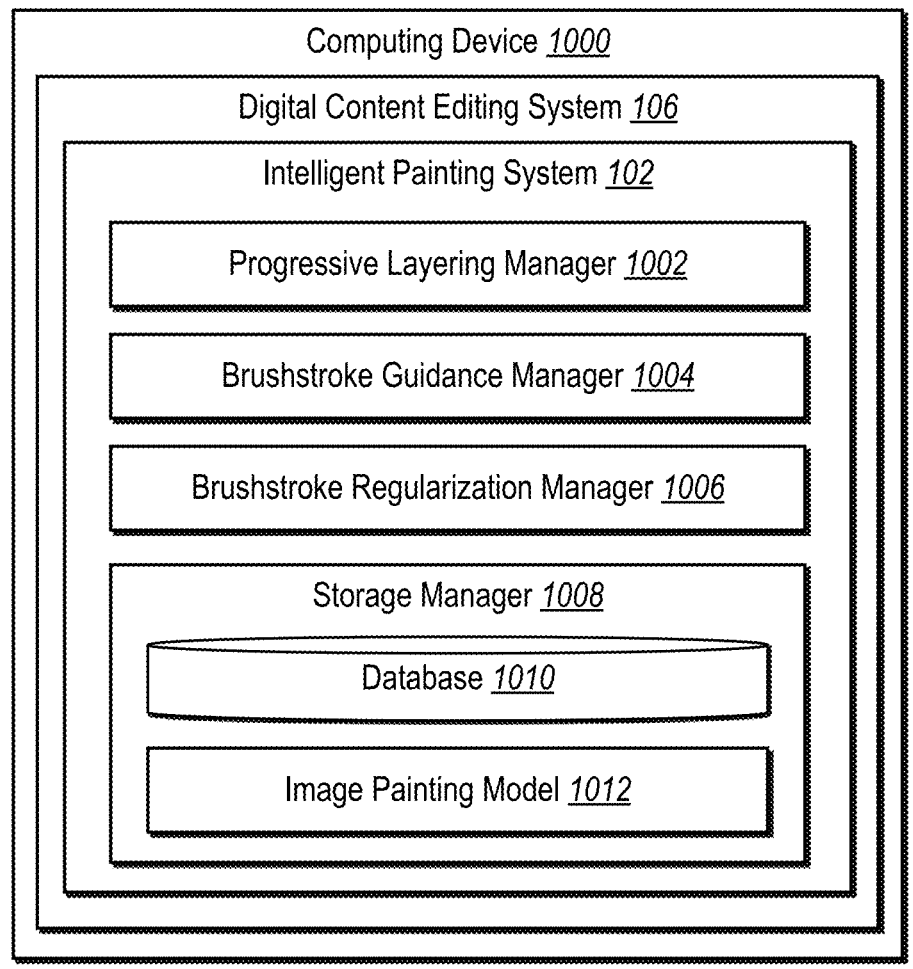
FIG. 10 illustrates an example schematic diagram of an intelligent painting system in accordance with one or more embodiments.

Looking now to FIG. 10, additional detail will be provided regarding components and capabilities of the intelligent painting system 102. Specifically, FIG. 10 illustrates an example schematic diagram of the intelligent painting system 102 on an example computing device 1000 (e.g., one or more of the client device 108 and/or the server(s) 104). As shown in FIG. 10, the intelligent painting system 102 includes a progressive layering manager 1002, a brushstroke guidance manager 1004, a brushstroke regularization manager 1006, and a storage manager 1008.

As just mentioned, the intelligent painting system 102 includes a progressive layering manager 1002. In particular, the progressive layering manager 1002 manages, maintains, performs, executes, generates, or implements a progressive layering process for digitally painting a digital image. For example, as described above, the progressive layering manager 1002 generates layer-specific digital brushstrokes based on saliencies of different portions of a target digital image. In some cases, the progressive layering manager 1002 generates background strokes to paint a background canvas before then generating (multiple layers of) foreground strokes to paint foreground images on the background canvas.

As further illustrated in FIG. 10, the intelligent painting system 102 includes a brushstroke guidance manager 1004. In particular, the brushstroke guidance manager 1004 manages, maintains, generates, determines, places, applies, or otherwise paints digital brushstrokes utilizing the guidance process described herein. For example, as described, the brushstroke guidance manager 1004 applies digital brushstrokes to paint foreground objects by identifying foreground objects based on saliency scores, designating foreground objects with global attention windows, and sequentially moving through regions of foreground objects to paint detailed features using fine attention windows.

Further, the intelligent painting system 102 includes a brushstroke regularization manager 1006. In particular, the brushstroke regularization manager 1006 manages, maintains, regularizes, generates, determines, modifies, updates, or identifies a brushstroke sequence for generating a painted digital image. For instance, as described above, the brushstroke regularization manager 1006 generates a modified brushstroke sequence from an initial brushstroke sequence (as determined via progressive layering and/or sequential brushstroke guidance) by paring or removing redundant brushstrokes, while also preserving accuracy in generating a final painted digital image that resembles a target digital image.

The intelligent painting system 102 further includes a storage manager 1008. The storage manager 1008 operates in conjunction with, or includes, one or more memory devices such as the database 1010 (e.g., the database 112) that stores various data such as target digital images and painted digital images. As described, one or more of the progressive layering manager 1002, the brushstroke guidance manager 1004, and/or the brushstroke regularization manager 1006 utilize the image painting model 1012 within the storage manager 1008.

In one or more embodiments, each of the components of the intelligent painting system 102 are in communication with one another using any suitable communication technologies. Additionally, the components of the intelligent painting system 102 is in communication with one or more other devices including one or more client devices described above. It will be recognized that although the components of the intelligent painting system 102 are shown to be separate in FIG. 10, any of the subcomponents may be combined into fewer components, such as into a single component, or divided into more components as may serve a particular implementation. Furthermore, although the components of FIG. 10 are described in connection with the intelligent painting system 102, at least some of the components for performing operations in conjunction with the intelligent painting system 102 described herein may be implemented on other devices within the environment.

The components of the intelligent painting system 102 can include software, hardware, or both. For example, the components of the intelligent painting system 102 can include one or more instructions stored on a computer-readable storage medium and executable by processors of one or more computing devices (e.g., the computing device 1000). When executed by the one or more processors, the computer-executable instructions of the intelligent painting system 102 can cause the computing device 1000 to perform the methods described herein. Alternatively, the components of the intelligent painting system 102 can comprise hardware, such as a special purpose processing device to perform a certain function or group of functions. Additionally, or alternatively, the components of the intelligent painting system 102 can include a combination of computer-executable instructions and hardware.

Furthermore, the components of the intelligent painting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the intelligent painting system 102 may be implemented as part of a stand-alone application on a personal computing device or a mobile device. Alternatively, or additionally, the components of the intelligent painting system 102 may be implemented in any application that allows creation and delivery of content to users, including, but not limited to, applications in ADOBE® EXPERIENCE MANAGER and CREATIVE CLOUD®, such as PHOTOSHOP®, FRESCO®, and INDESIGN®. "ADOBE," "ADOBE EXPERIENCE MANAGER," "CREATIVE CLOUD," "PHOTOSHOP," "FRESCO," and "INDESIGN" are either registered trademarks or trademarks of Adobe Inc. in the United States and/or other countries.

FIGS. 1-10, the corresponding text, and the examples provide a number of different systems, methods, and non-transitory computer readable media for generating painted digital images utilizing an image painting model for progressive layering, sequential brushstroke guidance, and/or brushstroke regularization. In addition to the foregoing, embodiments can also be described in terms of flowcharts comprising acts for accomplishing a particular result. For example, FIGS. 11-13 illustrate flowcharts of an example sequences or series of acts in accordance with one or more embodiments.

Figure 11:
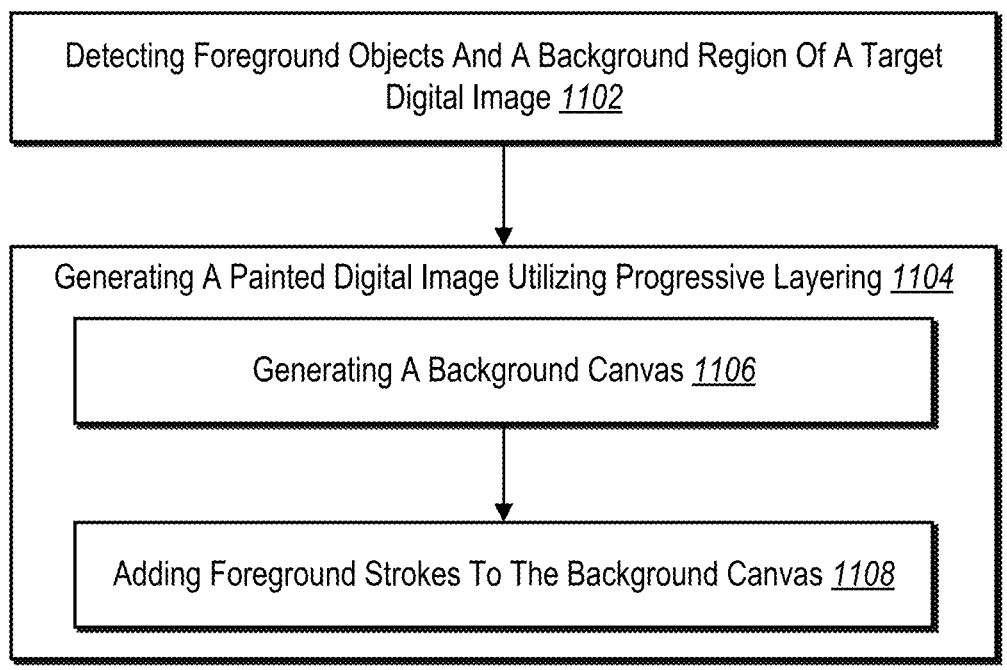
FIG. 11 illustrates a flowchart of a series of acts for generating a painted digital image utilizing progressive layering in accordance with one or more embodiments.
Figure 12:
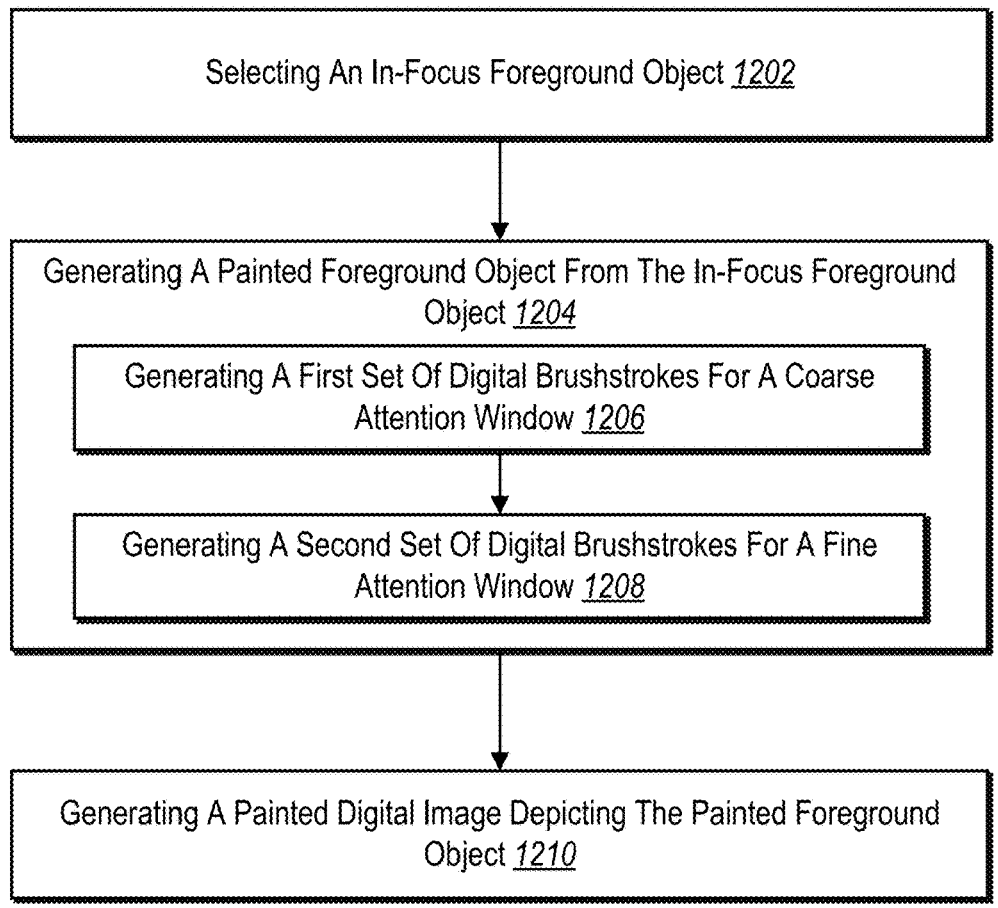
FIG. 12 illustrates a flowchart of a series of acts for generating a painted digital image utilizing sequential brushstroke guidance in accordance with one or more embodiments.
Figure 13:
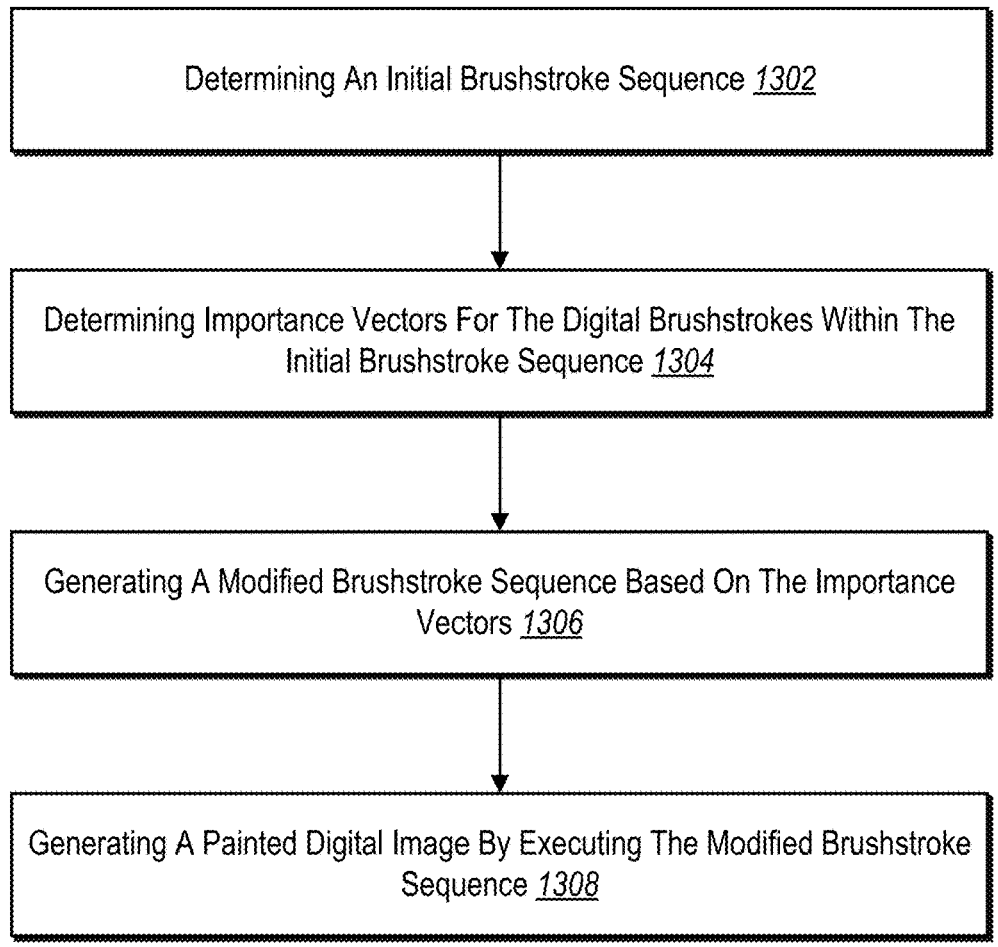
FIG. 13 illustrates a flowchart of a series of acts for generating a painted digital image utilizing brushstroke regularization in accordance with one or more embodiments.

While FIGS. 11-13 illustrate acts according to particular embodiments, alternative embodiments may omit, add to, reorder, and/or modify any of the acts shown in FIGS. 11-13. The acts of FIGS. 11-13 can be performed as part of a method. Alternatively, a non-transitory computer readable medium can comprise instructions, that when executed by one or more processors, cause a computing device to perform the acts of FIGS. 11-13. In still further embodiments, a system can perform the acts of FIGS. 11-13. Additionally, the acts described herein may be repeated or performed in parallel with one another or in parallel with different instances of the same or other similar acts.

FIG. 11 illustrates an example series of acts 1100 for generating a painted digital image utilizing a progressive layering process in accordance with one or more embodiments. For example, the series of acts 1100 includes an act 1102 of detecting foreground objects and a background region of a target digital image. Specifically, in some embodiments, the act 1102 involves detecting one or more foreground objects and a background region of a target digital image.

In addition, the series of acts 1100 includes an act 1104 of generating a painted digital image utilizing progressive layering. In particular, the act 1104 involves generating a painted digital image from the target digital image utilizing an image painting model to perform progressive layering. In some embodiments, the act 1104 involves generating the foreground strokes to add to the background canvas by utilizing coarse-to-fine attention windows on the one or more foreground objects. In one or more implementations, the act 1104 involves utilizing the image painting model by generating the painted digital image utilizing a generative adversarial neural network trained via reinforcement learning.

In some cases, the act 1104 includes an act 1106 of generating a background canvas. For instance, the act 1106 involves generating a background canvas from the target digital image by generating background strokes portraying the background region of the target digital image. In one or more embodiments, the act 1106 involves replacing pixels depicting the one or more foreground objects with the background strokes portraying the background region. In these or other embodiments, the act 1106 involves generating the background strokes by utilizing a background reward function for the image painting model to generate the background strokes portraying the background region. In some cases, the act 1106 involves generating a first layer of the progressive layering and adding the foreground strokes to the background canvas comprises generating a second layer of the progressive layering.

In certain embodiments, the act 1104 also includes an act 1108 of adding foreground strokes to the background canvas. In one or more cases, the act 1108 involves generating the painted digital image by adding foreground strokes portraying painted versions of the one or more foreground objects to the background canvas.

In some embodiments, the series of acts 1100 includes an act of determining an initial brushstroke sequence for generating the painted digital image from the target digital image. In certain cases, the series of acts 1100 includes an act of generating a modified brushstroke sequence from the initial brushstroke sequence utilizing brushstroke regularization. In these or other cases, the series of acts 1100 includes an act of generating the painted digital image from the target digital image by executing the modified brushstroke sequence utilizing the image painting model.

FIG. 12 illustrates an example series of acts 1200 for generating a painted digital image utilizing sequential brushstroke guidance in accordance with one or more embodiments. For example, the series of acts 1200 includes an act 1202 of selecting an in-focus foreground object. In particular, the act 1202 involves selecting an in-focus foreground object from among a set of foreground objects depicted within the target digital image. In some cases, the act 1202 involves utilizing a global attention window in relation to the set of foreground objects depicted within the target digital image.

As shown, the series of acts 1200 includes an act 1204 of generating a painted foreground object from the in-focus foreground object. For example, the act 1204 involves generating a painted foreground object from the in-focus foreground object depicted within the target digital image by utilizing the image painting model. In some cases, the act 1204 involves sequentially shifting through a set of coarse-to-fine attention windows placed relative to the in-focus foreground object and that comprises the coarse attention window and the fine attention window. In one or more implementations, the act 1204 involves sequentially shifting through the set of coarse-to-fine attention windows by predicting successive Markovian coordinate refinements for coordinate locations of coarse-to-fine attention windows within the set of coarse-to-fine attention windows utilizing the image painting model.

In some cases, the act 1204 includes an act 1206 of generating a coarse attention window indicating (e.g., bounding) a foreground object. For example, the act 1206 involves generating a set of digital brushstrokes for a coarse attention window corresponding to the in-focus foreground object (e.g., within the coarse attention window).

In one or more embodiments, the act 1204 includes an act 1208 of generating a second set of digital brushstrokes for a fine attention window. For example, the act 1208 involves generating a second set of digital brushstrokes for a fine attention window corresponding to the in-focus foreground object. In some cases, the series of acts 1200 includes an act of determining a coordinate location for the fine attention window within the target digital image based on a coordinate location for the coarse attention window.

In addition, the series of acts 1200 includes an act 1210 of generating a painted digital image depicting the painted foreground object. For example, the act 1210 involves generating a painted digital image from the target digital image and depicting the painted foreground object. In some cases, the act 1210 involves generating the painted digital image from the target digital image utilizing the image painting model to perform progressive layering by: generating a background canvas from the target digital image and adding foreground strokes depicting painted versions of the set of foreground objects to the background canvas. In certain embodiments, the act 1210 involves generating a modified brushstroke sequence from an initial brushstroke sequence utilizing brushstroke regularization and generating the painted digital image from the target digital image by executing the modified brushstroke sequence utilizing the image painting model.

FIG. 13 illustrates an example series of acts 1300 for generating a painted digital image utilizing brushstroke regularization in accordance with one or more embodiments. For example, the series of acts 1300 includes an act 1302 of determining an initial brushstroke sequence. In some cases, the act 1302 involves determining an initial brushstroke sequence for generating a painted digital image from a target digital image utilizing an image painting model. In some cases, the act 1302 involves determining a number of layers to paint as part of a progressive layering process to generate the painted digital image. In addition, the act 1302 involves determining an initial number of digital brushstrokes to paint within each layer of the progressive layering process.

As further illustrated in FIG. 13, the series of acts 1300 includes an act 1304 of determining importance vectors for digital brushstrokes within the initial brushstroke sequence.

In particular, the act 1304 involves determining respective importance vectors for digital brushstrokes within the initial brushstroke sequence.

In addition, the series of acts 1300 includes an act 1306 of generating a modified brushstroke sequence based on the importance vectors. In particular, the act 1306 involves generating a modified brushstroke sequence from the initial brushstroke sequence by generating modified digital brushstrokes from the digital brushstrokes of the initial brushstroke sequence according to the respective importance vectors. In some cases, the act 1306 involves determining the modified digital brushstrokes according to a brushstroke regularization loss that balances between brushstroke parameters and the respective importance vectors.

Further, the series of acts 1300 includes an act 1308 of generating a painted digital image by executing the modified brushstroke sequence. In particular, the act 1308 involves generating the painted digital image from the target digital image by executing the modified brushstroke sequence utilizing the image painting model. In some cases, the act 1308 involves executing the modified brushstroke sequence comprising fewer digital brushstrokes than the initial brushstroke sequence. In these or other cases, the act 1308 involves utilizing the image painting model to perform progressive layering by: generating a background canvas from the target digital image portraying a background region of the target digital image and adding foreground strokes portraying foreground objects to the background canvas. In one or more embodiments, the act 1308 involves utilizing the image painting model to perform sequential brushstroke guidance by: generating a first set of digital brushstrokes for a coarse attention window corresponding to a foreground object within the target digital image and generating a second set of digital brushstrokes for a fine attention window corresponding to the foreground object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
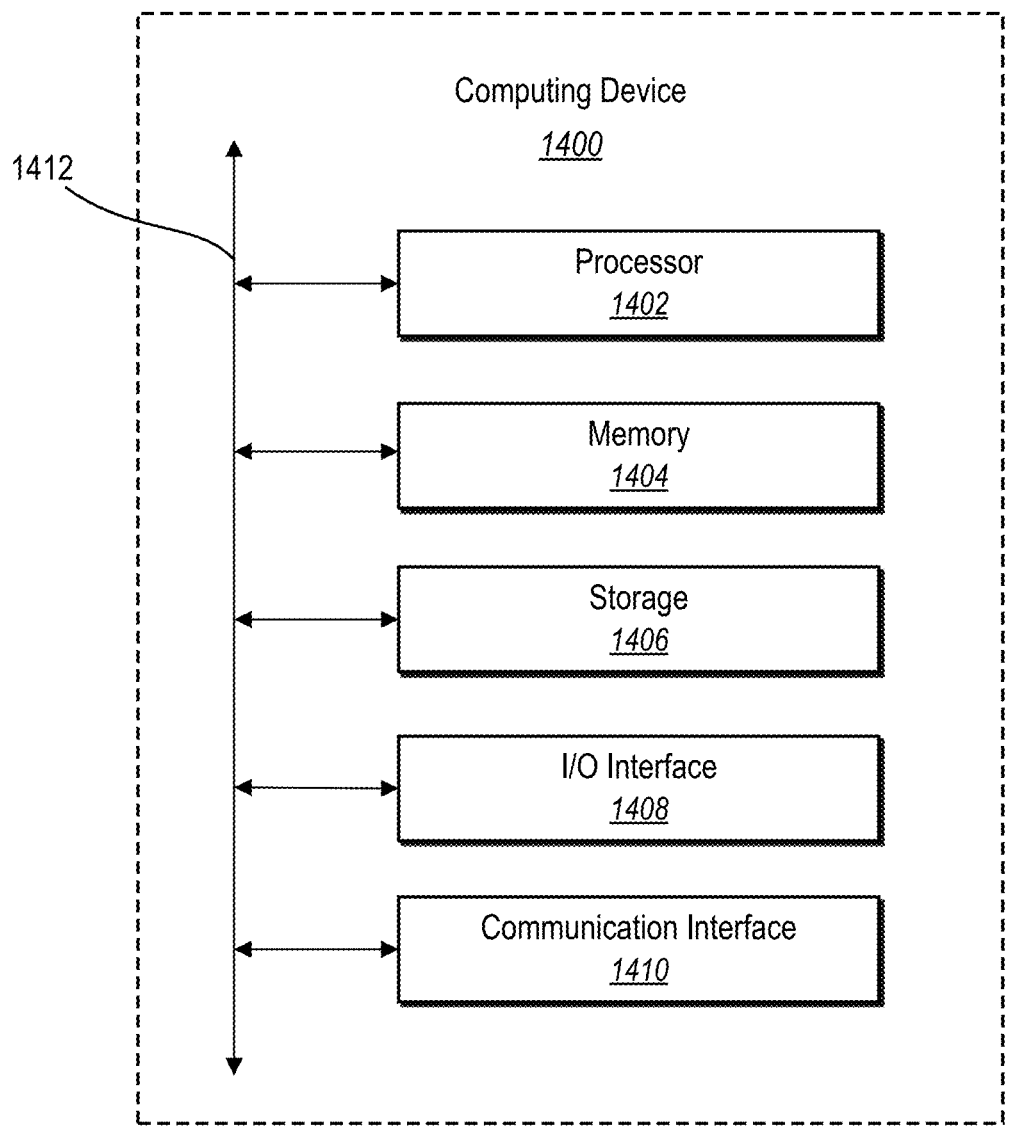
FIG. 14 illustrates a block diagram of an example computing device in accordance with one or more embodiments.

FIG. 14 illustrates, in block diagram form, an example computing device 1400 (e.g., the computing device 1000, the client device 108, and/or the server(s) 104) that may be configured to perform one or more of the processes described above. One will appreciate that the intelligent painting system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions that, when executed by at least one processor, cause a computing device to:
  generate a painted digital image from a target digital image comprising one or more foreground objects and a background region utilizing an image painting model to perform progressive layering by:

generating, for a digital canvas of digital painting strokes, background strokes for a first painting layer in the progressive layering, wherein the background strokes portray a painted version of the background region of the target digital image;

generating foreground strokes for one or more successive painting layers added to the first painting layer in the digital canvas, wherein the foreground strokes portray painted versions of the one or more foreground objects in the target digital image;

comparing states of the digital canvas with the target digital image according to a layer-specific reward function that incorporates a foreground saliency map to indicate salient foreground objects; and generating the painted digital image from the digital canvas by adding the foreground strokes of the one or more successive painting layers to the background strokes of the first painting layer based on comparing the states of the digital canvas with the target digital image using the layer-specific reward function.

2. The non-transitory computer readable medium of claim 1, wherein generating the digital canvas comprises replacing pixels depicting at least one foreground object with the background strokes portraying the painted version of the background region.

3. The non-transitory computer readable medium of claim 1, wherein the layer-specific reward function enforces comparisons of the digital canvas with the background region of the target digital image while ignoring salient foreground regions of the target digital image according to the foreground saliency map.

4. The non-transitory computer readable medium of claim 1, wherein generating the digital canvas comprises adding one or more of the foreground strokes to the digital canvas in a second painting layer of the progressive layering.

5. The non-transitory computer readable medium of claim 1, wherein generating the painted digital image comprises generating the foreground strokes to add to the digital canvas by utilizing coarse-to-fine attention windows on the one or more foreground objects.

6. The non-transitory computer readable medium of claim 1, further storing instructions that, when executed by the at least one processor, cause the computing device to:
determine an initial brushstroke sequence for generating the painted digital image from the target digital image;
generate a modified brushstroke sequence from the initial brushstroke sequence utilizing brushstroke regularization; and
generate the painted digital image from the target digital image by executing the modified brushstroke sequence utilizing the image painting model.

7. The non-transitory computer readable medium of claim 1, further storing instructions that, when executed by the at least one processor, cause the computing device to generate the painted digital image utilizing the image painting model by generating the painted digital image utilizing reinforcement learning trained via a generative adversarial neural network.

8. A system comprising:
a memory device comprising a target digital image and an image painting model; and
one or more processors coupled to the memory device, the one or more processors configured to:
select, from among a set of foreground objects depicted within the target digital image, an in-focus foreground object to digitally paint before painting other foreground objects in the set of foreground objects one at a time;
generate a painted foreground object from the in-focus foreground object depicted within the target digital image by utilizing the image painting model to:
generate a coarse attention window indicating the in-focus foreground object; and
generate a set of digital brushstrokes for a fine attention window within the coarse attention window;
upon generating the painted foreground object, sequentially generate subsequent painted foreground objects one at a time from the set of foreground objects in the target digital image; and
generate, from the target digital image, a painted digital image depicting the painted foreground object and the subsequent painted foreground objects.

9. The system of claim 8, wherein the one or more processors are configured to select the in-focus foreground object by utilizing the coarse attention window in relation to the set of foreground objects depicted within the target digital image.

10. The system of claim 8, wherein the one or more processors are configured to generate the painted foreground object by sequentially shifting through a set of coarse-to-fine attention windows placed relative to the in-focus foreground object and that comprises the coarse attention window and the fine attention window.

11. The system of claim 10, wherein sequentially shifting through the set of coarse-to-fine attention windows comprises predicting successive Markovian coordinate refinements for coordinate locations of coarse-to-fine attention windows within the set of coarse-to-fine attention windows utilizing the image painting model.

12. The system of claim 8, wherein the one or more processors are further configured to determine a coordinate location for the fine attention window within the target digital image based on a coordinate location for the coarse attention window.

13. The system of claim 8, wherein the one or more processors are further configured to generate the painted digital image from the target digital image utilizing the image painting model to perform progressive layering by:
generating a background canvas from the target digital image; and
adding foreground strokes depicting painted versions of the set of foreground objects to the background canvas.

14. The system of claim 8, wherein the one or more processors are further configured to generate the painted digital image by:
generating a modified brushstroke sequence from an initial brushstroke sequence utilizing brushstroke regularization; and
generating the painted digital image from the target digital image by executing the modified brushstroke sequence utilizing the image painting model.

15. A computer-implemented method comprising:
determining an initial brushstroke sequence for generating a painted digital image from a target digital image utilizing an image painting model;
determining respective importance vectors for digital brushstrokes within the initial brushstroke sequence;
generating a modified brushstroke sequence from the initial brushstroke sequence by generating modified digital brushstrokes from the digital brushstrokes of the initial brushstroke sequence according to the respective importance vectors; and generating the painted digital image from the target digital image by executing the modified brushstroke sequence utilizing the image painting model.

16. The computer-implemented method of claim 15, wherein determining the initial brushstroke sequence comprises determining digital brushstrokes using progressive layering and sequential brushstroke guidance based on:
   a number of layers to paint as part of a progressive layering process to generate the painted digital image; and
   an initial number of digital brushstrokes to paint within each layer of the progressive layering process.

17. The computer-implemented method of claim 15, wherein generating the modified brushstroke sequence comprises determining the modified digital brushstrokes according to a brushstroke regularization loss that adjusts brushstroke parameters and the respective importance vectors.

18. The computer-implemented method of claim 15, wherein generating the painted digital image comprises executing the modified brushstroke sequence comprising fewer digital brushstrokes than the initial brushstroke sequence.

19. The computer-implemented method of claim 15, wherein generating the painted digital image comprises utilizing the image painting model to perform progressive layering by:
   generating a background canvas from the target digital image portraying a background region of the target digital image; and
   adding foreground strokes portraying foreground objects to the background canvas.

20. The computer-implemented method of claim 15, wherein generating the painted digital image comprises utilizing the image painting model to perform sequential brushstroke guidance by:
   generating a coarse attention window indicating a foreground object within the target digital image; and
   generating a set of digital brushstrokes for a fine attention window within the coarse attention window.

* * * * *